(12) United States Patent
Soave et al.

(10) Patent No.: US 11,603,926 B2
(45) Date of Patent: Mar. 14, 2023

(54) GEAR SEEKING POLYSTABLE SHIFTER

(71) Applicant: Kuster North America, Inc., Troy, MI (US)

(72) Inventors: Christopher Soave, Oxford, MI (US); Calogero Alu, Shelby Charter Township, MI (US)

(73) Assignee: Kuster North America, Inc., Troy, MI (US)

( * ) Notice: Subject to any disclaimer, the term of this patent is extended or adjusted under 35 U.S.C. 154(b) by 0 days.

(21) Appl. No.: 17/695,904

(22) Filed: Mar. 16, 2022

(65) Prior Publication Data

US 2022/0325790 A1 Oct. 13, 2022

Related U.S. Application Data

(60) Provisional application No. 63/172,384, filed on Apr. 8, 2021.

(51) Int. Cl.
  *F16H 61/22* (2006.01)
  *F16H 63/38* (2006.01)
  (Continued)

(52) U.S. Cl.
  CPC ........... *F16H 61/22* (2013.01); *F16H 59/105* (2013.01); *F16H 63/38* (2013.01); *F16H 2059/026* (2013.01); *F16H 2061/223* (2013.01)

(58) Field of Classification Search
  CPC ......... F16H 2059/026; F16H 2061/243; F16H 2061/2869; F16H 59/105; F16H 61/22; F16H 63/38
  See application file for complete search history.

(56) References Cited

U.S. PATENT DOCUMENTS 7,610,137 B2 10/2009 Kwon
3,000,865 A1 8/2011 Conlon et al.
(Continued)

FOREIGN PATENT DOCUMENTS

CN 108730499 A 11/2018
KR 10-2011-0006923 A 1/2011
WO 2008006021 A2 1/2008

OTHER PUBLICATIONS

International Search Report and Written Opinion for PCT Application No. PCT/US2022/023576 dated Jul. 27, 2022, 9 pages.
(Continued)

*Primary Examiner* — William C Joyce
*Assistant Examiner* — Gregory T Prather
(74) *Attorney, Agent, or Firm* — Dinsmore & Shohl LLP

(57) ABSTRACT

A gear seeking shifter having a housing containing a shift lever with a depressible inner push rod. A CAM component is rotatably supported to a base of the shift lever and is driven by a gear seeking motor. An upwardly biased gate pawl is secured to the inner push rod into contact with any of a PRND shifter position gates configured along an opposing underside of said housing. At least one detent pawl is supported within the housing in biasing contact with a detent plate configured upon an opposing inside surface of the housing. The CAM component, upon being rotated by the motor, includes each of a first profile for retracting the gate pawl and a second profile for engaging and inwardly displacing the detent pawl away from contact with the detent plate to permit the CAM component to rotate the shift lever to a desired gear position.

20 Claims, 20 Drawing Sheets

(51) Int. Cl.
  *F16H 59/02* (2006.01)
  *F16H 59/10* (2006.01)

(56) References Cited

U.S. PATENT DOCUMENTS

| | | | |
|---|---|---|---|
| 9,334,949 B2 | 5/2016 | Fett et al. | |
| 10,030,763 B2 | 7/2018 | Sawada et al. | |
| 10,088,040 B2 | 10/2018 | Mitteer et al. | |
| 10,677,344 B2 | 6/2020 | Wang et al. | |
| 10,927,946 B2 | 2/2021 | Heo et al. | |
| 2004/0226801 A1 | 11/2004 | De Jonge et al. | |
| 2006/0016287 A1 | 1/2006 | Grossman et al. | |
| 2009/0217782 A1* | 9/2009 | Wang | F16H 61/22 74/473.21 |
| 2014/0007729 A1* | 1/2014 | Fredriksson | F16H 59/0204 74/473.21 |
| 2014/0155221 A1 | 6/2014 | Conlon et al. | |
| 2017/0074391 A1* | 3/2017 | Tebbe | F16H 61/22 |
| 2017/0114892 A1* | 4/2017 | Abe | F16H 61/24 |
| 2017/0219095 A1 | 8/2017 | Beattie et al. | |
| 2017/0356543 A1* | 12/2017 | Turney | F16H 59/105 |
| 2018/0172140 A1* | 6/2018 | Liubakka | B60K 20/02 |
| 2018/0283543 A1* | 10/2018 | Cha | F16H 61/24 |
| 2018/0320780 A1 | 11/2018 | Heo et al. | |
| 2019/0219166 A1 | 7/2019 | Krishnam et al. | |
| 2020/0003300 A1 | 1/2020 | Yang | |
| 2020/0096100 A1 | 3/2020 | Cha | |
| 2020/0149626 A1 | 5/2020 | Nakagawa | |
| 2020/0166123 A1* | 5/2020 | Bagley | F16H 59/08 |
| 2020/0309252 A1* | 10/2020 | Jiran | F16H 59/0204 |

OTHER PUBLICATIONS

International Search Report and Written Opinion for PCT Application No. PCT/US2022/020678 dated Jun. 30, 2022, 10 pages.

* cited by examiner

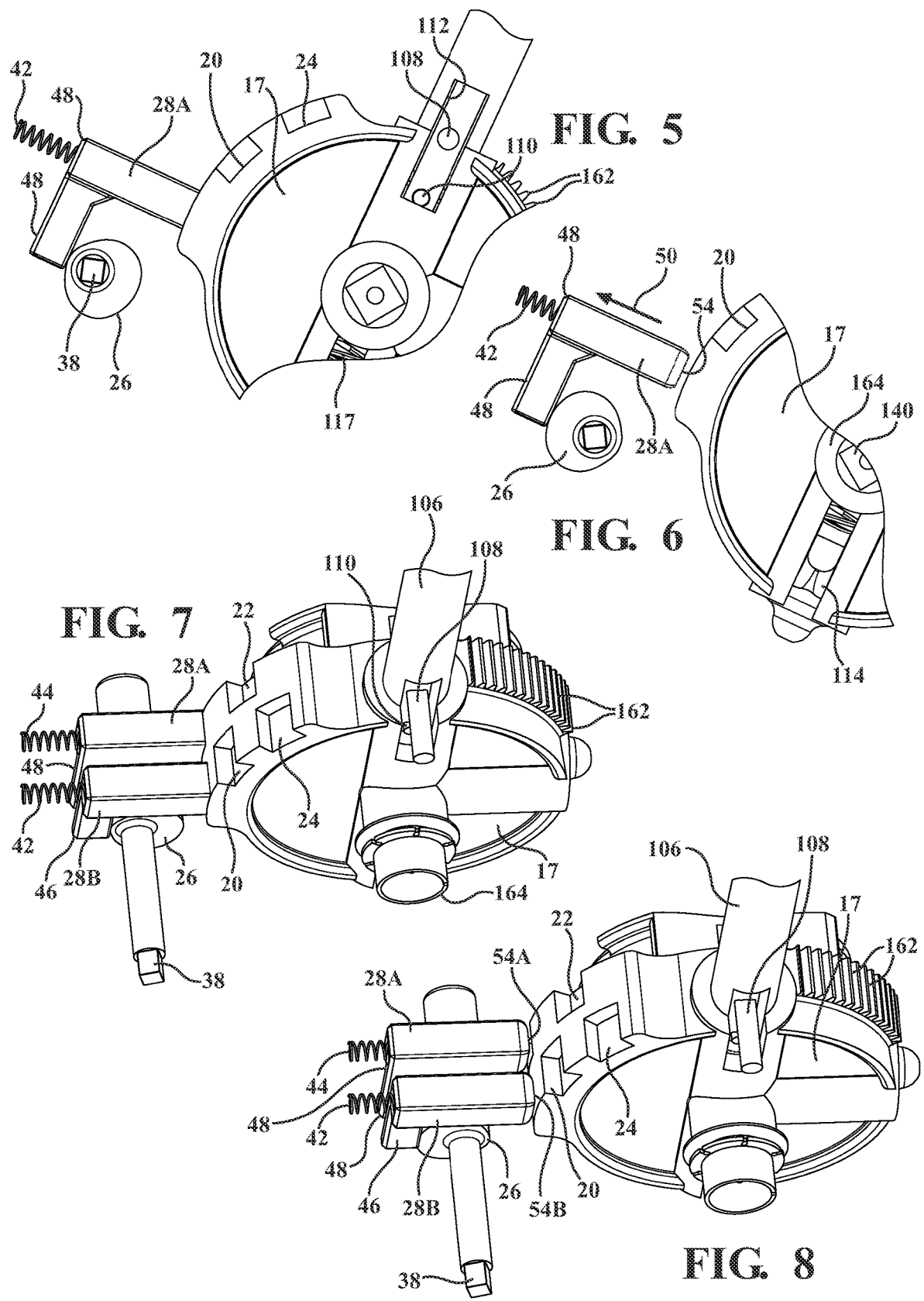

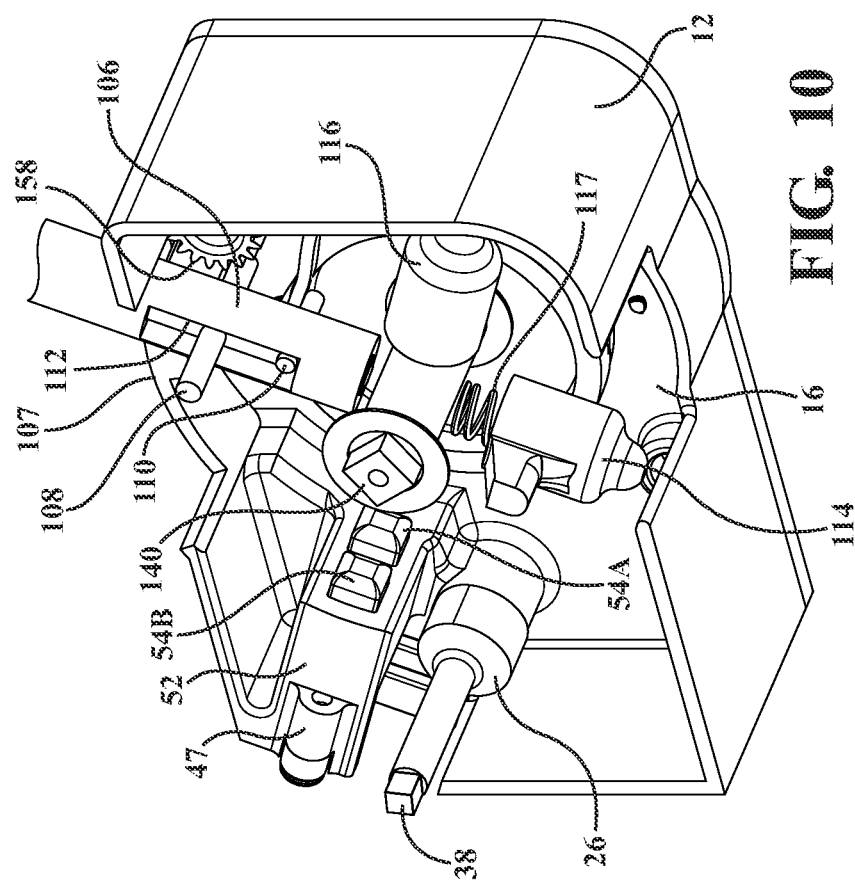
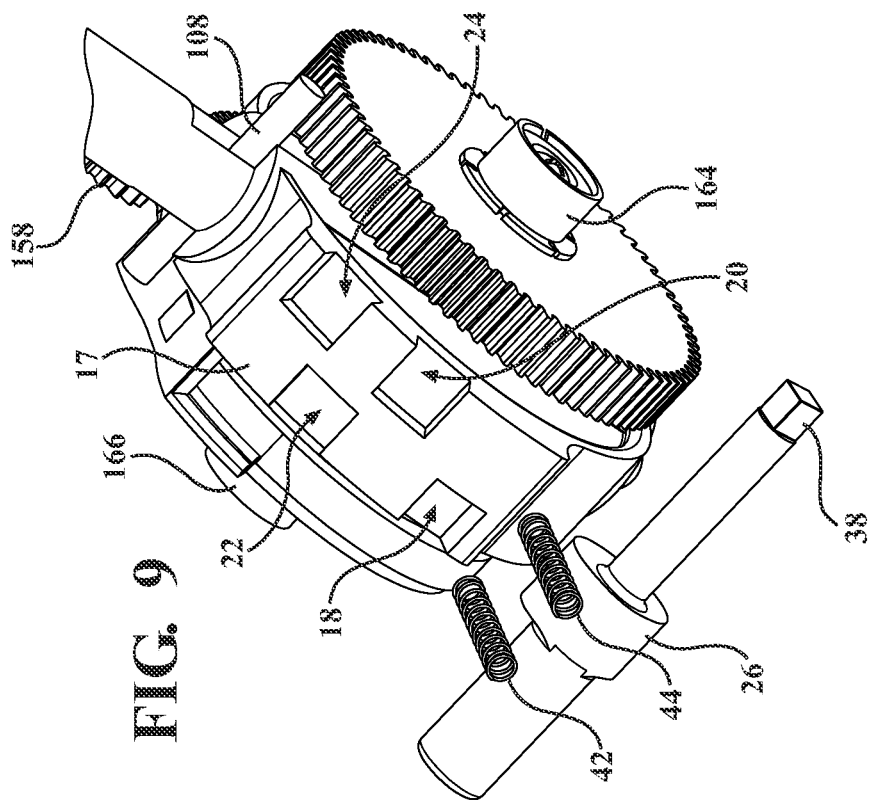

GEAR SEEKING POLYSTABLE SHIFTER

CROSS REFERENCE TO RELATED APPLICATIONS

The present application claims the priority of U.S. Ser. No. 63/172,384 filed Apr. 8, 2021.

FIELD OF THE INVENTION

The present invention relates generally to shifter assemblies and, more particularly, to a gear seeking shifter having retracting gate and pawl functionality for allowing seeking of a desired gear shift position. The shift lever is supported between left and right rotatable CAM components which, in combination with retractable upper gate and lower detent pawls, allows gear seeking to occur without motor overload in the instance of lever obstruction and in addition to allowing variable shift distances between each of the gear positions (Park to Reverse, Reverse to Neutral, Neutral to Drive and Drive to Motor.

Other features include a lock mechanism incorporating an electric motor for rotating a separate cam component in communication with one or more spring loaded and displaceable plungers which are normally spring biased into a locked or engagement position with a shift lever or other independently rotatable component. Actuated rotation of the cam in turn counter-biases one or more plungers or lock arms in a retracting or disengaging direction from the shift lever or other independently rotatable component in order to unlock the component.

BACKGROUND OF THE INVENTION

Most shifters in the market do not possess the ability to gear seek, when commanded by the transmission. This results in the transmission and gear shifter having the potential to be out of synchronization with each other, resulting in the driver being required to move the shift lever to the transmission position manually when desynchronization occurs, this leading to potential confusion or safety concerns.

The prior art also discloses other gear driven shifter assemblies, such as depicted in U.S. Pat. No. 10,927,946. Most existing systems having gear seeking ability do not have a polystable knob style shifting interface, so resets can be controlled by purely resetting the gear position by changing LED indication of the gear.

Polystable knob style gear seeking shifters found in the market have motor systems that drive the shift knob to positions, but also require high stall loads of the motor to manage instances of obstruction with the knob, or utilize detent profiles and springs to provide the interference for driving the shift knob to the proper position.

The use of the standard detent profile and spring in a gear seeking assembly to provide the resistance for returning the knob to position results in loud noises as the detents are jumped when an obstruction exists, as well as requiring a tight balance between shift effort and motor driving effort to prevent jumping of the detents during unobstructed gear seeking. Additionally, the prior art polystable knob gear seeking shifters require the distance or angular position between park and reverse to be equal to the distance between reverse and neutral, and neutral and drive, not providing the driver with a tactile difference to indicate that shifting is occurring between park and reverse versus other gear positions.

Prior art polystable systems further require high strength parts or increased part counts to manage the systems, leading to high mass, high cost and large size shifter assemblies, with a high number of failure modes to consider in design.

Also, current locking mechanisms incorporate a solenoid and a motor. An example of this is depicted in the auto return to park rotary shifter of U.S. Ser. No. 10/677,344 to Kuster and which includes a solenoid 92 including an extending portion 98 which engages a recessed annular location 94 of a rotatable stopper disk 90. The solenoid can be energized in order to retract the linear portion 98 out of engagement with the stopper disk.

Shortcomings of conventional solenoid locking mechanisms include the large size and cost requirements in order to provide proper response time and travel at all temperature and supply voltage ranges. Additionally, solenoids are only monitored by on or off positions, as well as being limited as to load limitations of the solenoid piston, such requiring the use of either additional mechanisms to move the loading to other parts of mechanism, or by limiting the load against which the solenoid acts. Additionally, existing motor systems drive and position the plunger assemblies but do not have the ability to position multiple pistons.

SUMMARY OF THE PRESENT INVENTION

The present invention discloses a gear seeking shifter having a housing containing a shift lever with a rotatable base and a fixed outer tube supporting an upwardly extending and depressible inner push rod. A CAM component is slaved to the rotatable base and is driven by a gear seeking motor.

An upwardly biased gate pawl is secured to the inner push rod into contact with any of a PRND shifter position gates configured along an opposing underside of said housing. At least one detent pawl is supported within the housing in biasing contact with a detent plate profile configured upon an opposing inside surface of the housing. The CAM component, upon being rotated by the gear seeking motor, includes each of a first profile for retracting the gate pawl and a second profile for engaging and inwardly displacing the detent pawl away from contact with the detent plate profile and to permit the CAM component to rotate the shift lever to a desired gear position.

Additional features include a shift position sensor gear with end support magnet rotatably slaved to the CAM component, a printed circuit board assembly (PCBA) is mounted within the housing in proximity to the sensor gear and includes a sensor opposing a shaft end supported magnet of the sensor gear for instructing rotation of the gear seeking motor.

The CAM component further includes a left CAM component, a second right CAM component arranged on an opposite side of the rotatable base and which is slaved to the left CAM component. The at least one detent pawl further includes each of an upper detent pawl actuated by rotation of the left CAM component and a lower detent pawl actuated by rotation of the right CAM component, the detent plate profile further includes a first lower plate opposing the first detent pawl and a second upper plate opposing the second detent pawl.

A gate pawl retraction pin is secured to the push rod below the upwardly biased gate pawl, a push rod spring seated within a pocket in the outer tube for upwardly biasing the gate pawl and push rod. The gear seeking motor further includes a worm engaging a gear seeking worm gear for driving the right CAM component and slaved left CAM component.

The housing further includes inter-assemblable left and right housing portions. The rotatable base of the shift lever further includes a plurality of notches or recesses configured within an arcuate surface and corresponding to the PRND positions.

A lock motor is configured to rotate a shaft supported eccentric cam extending within the housing, the cam actuating at least one plunger having an extending portion aligning with a selected one of the notches and such that, upon rotation of the cam by the motor, the plunger being caused to displace to a disengaged position to permit gear seeking rotation of the shift lever.

The lock motor further includes a worm shaft actuating a worm gear, the eccentric cam including an extending end in slaved relationship with the bevel gear so that actuation of the motor causes rotation of the cam. The at least one plunger further includes each of a first plunger in aligning relationship with a first pair of the notches defining Park and Neutral shifter locations and a second plunger in aligning relationship with a second pair of notches defining Reverse and Drive positions associated with the lever shifter rotatable base.

First and second coil springs are provided for biasing said first and second plungers in an engaged position relative to said shifter. A magnet is supported upon an end of the shaft supported eccentric cam and, in response to rotation relative to a proximately located sensor, detecting a position of the cam.

BRIEF DESCRIPTION OF THE DRAWINGS

Reference will now be made to the attached drawings, when read in combination with the following detailed description, wherein like reference numerals refer to like parts throughout the several views, and in which:

FIG. 5 depicts the interior component of the assembly without the motor and gear, and in order to better show the plungers or lever arms in the locked/engaged position within the mating recesses defined in the shift lever or handle prior to engagement by the cam;

FIG. 6 is a succeeding view to FIG. 5 and depicting the rotation of the cam against the plungers, resulting in a counter-biasing and retracting motion exerted on the plungers in order to disengage from the shift lever;

FIG. 7 presents a further rotated view of the dual plunger arrangement shown in combination with stepped recesses configured in the shift lever for mating with the plungers corresponding to given shifter positions;

FIG. 8 is a substantial repeat of FIG. 7 and better showing cam interface position of FIG. 6 for retracting the plungers out of spring biased engagement within the mating recesses configured into the shift lever or handle;

FIG. 9 presents a further illustration with the plungers or lock arms removed and better showing recessed notches in the shifter lever corresponding to each of Park, Reverse, Neutral and Drive positions;

FIG. 10 provides a further sectional perspective illustrating the manner in which the plungers are displace-ably supported within the left hand housing relative to the shift lever or handle and for actuation by the cam;

DETAILED DESCRIPTION OF THE PREFERRED EMBODIMENTS

With reference to the attached illustrations, the present invention discloses a gear seeking shifter having retracting gate and pawl functionality for allowing seeking of a desired gear shift position. As will be further described, the shift lever is held between left and right CAM components which, in combination with retractable upper gate and lower detent pawls, allows gear seeking to occur without motor overload in the instance of lever obstruction, in addition to allowing a variable shift distance between the gear positions (Park to Reverse, Reverse to Neutral, Neutral to Drive and Drive to Motor), and as opposed to equidistant gear positions as required by the prior art. Other features include a lock mechanism incorporating an electric motor for rotating a separate cam component in communication with one or more spring loaded and displaceable plungers which are normally spring biased into a locked or engagement position with a shift lever or other independently rotatable component.

Figure 1:
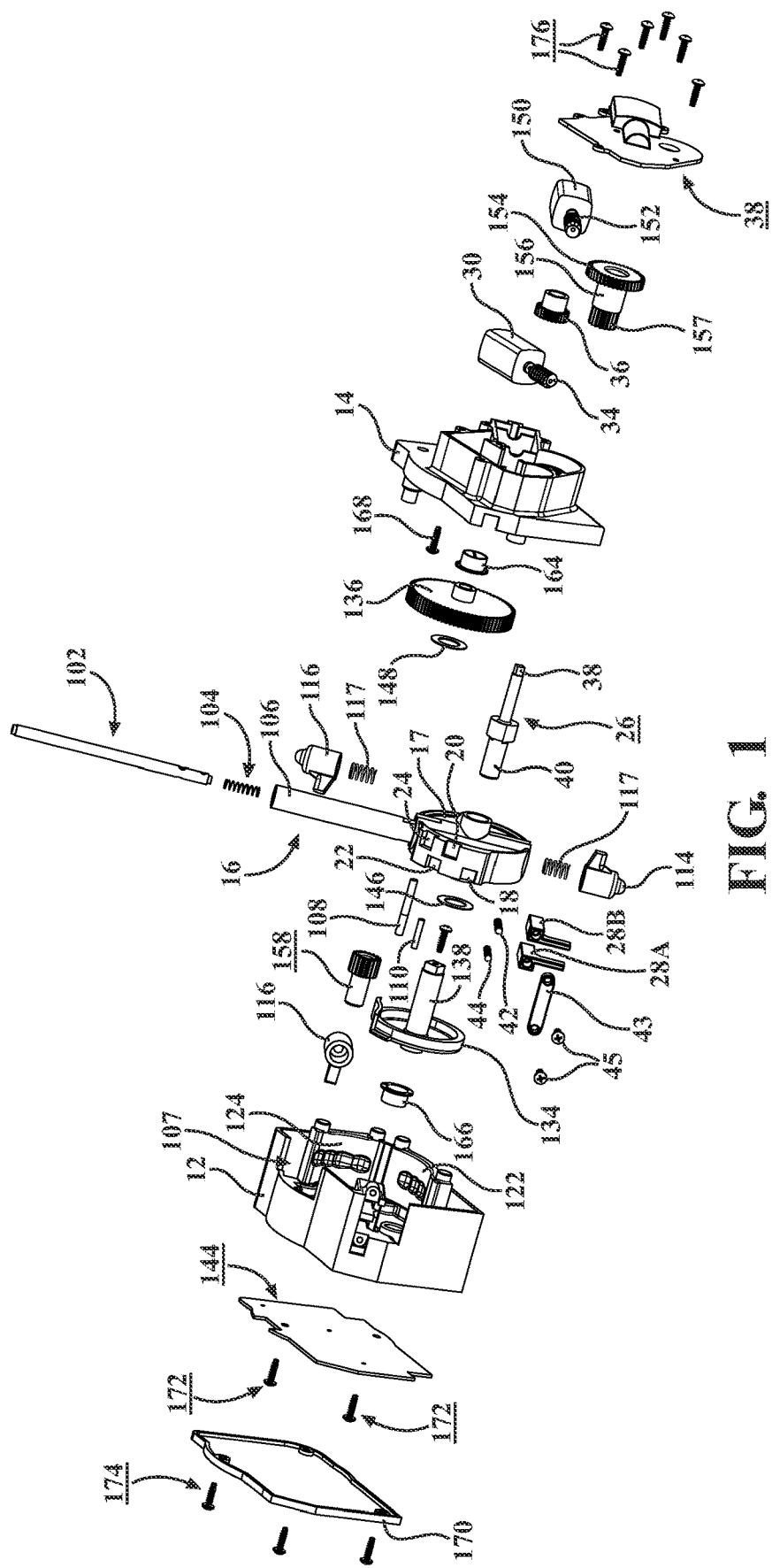
FIG. 1 is an overall exploded view of the gear seeking polystable shifter assembly and which combines the plunger lock mechanism, shifting mechanism including retractable detent and pawl, and gear seeking subassembly with gear seeking motor, worm gear and right/left CAM components arranged on opposite sides of a centrally disposed shift lever assembly.

FIG. 1 presents an overall exploded view of the gear seeking polystable shifter assembly which combines the plunger lock mechanism, shifting mechanism including retractable detent and pawl, and gear seeking subassembly with gear seeking motor, worm gear and right/left CAM components arranged on opposite sides of a centrally disposed shift lever assembly. A detailed description will be initially provided of the plunger lock mechanism, with successive descriptions for provided for each of the shifting and gear seeking mechanisms forming components of the present invention.

Figure 2:
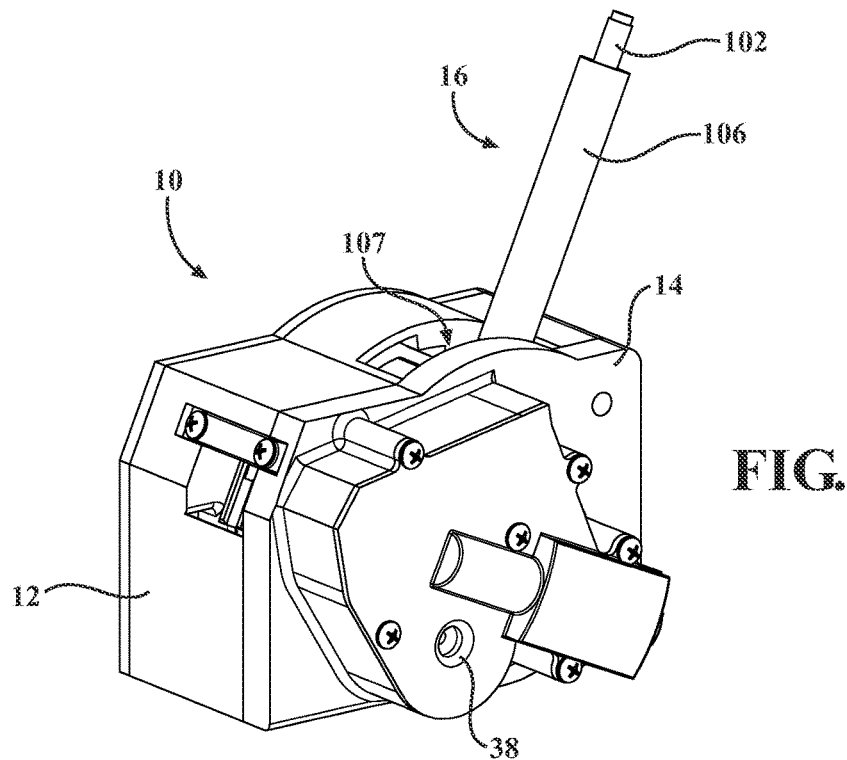
FIG. 2 is an assembled perspective and FIG. 2A an exploded view of the plunger lock mechanism according to one non-limiting embodiment of the present invention and depicted incorporated into a lever style shifter, in which a motor and gear assembly rotates a cam for actuating a pair of locking arms or plungers between a spring loaded engaged position with the lever and a retracted/disengaged position for permitting rotation of the shift lever.
Figure 2A:
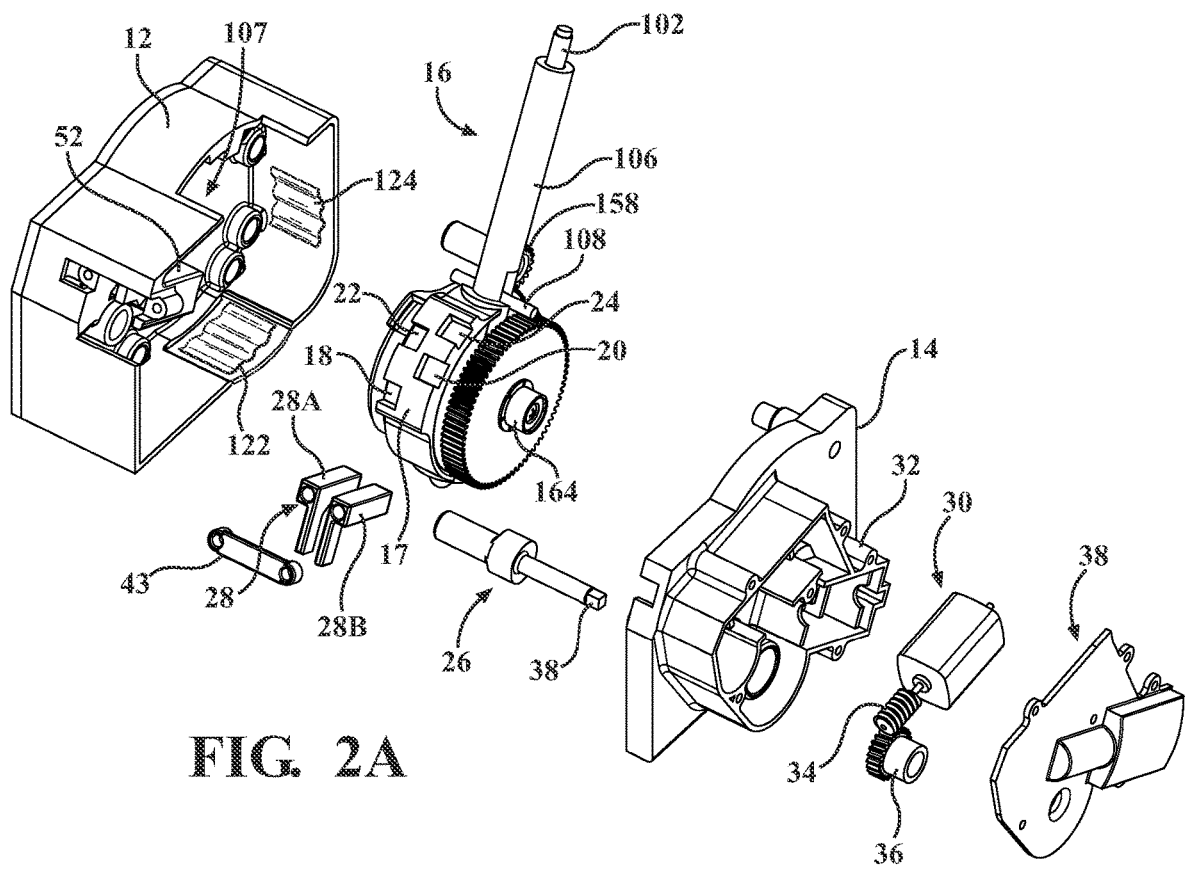

Referring again to FIG. 1 and to FIGS. 2 and 2A in combination, a pair of assembled and exploded views are provided of the plunger lock mechanism forming a first component of the gear seeking polystable shifter of the present invention and which is shown incorporated into a lever style shifter assembly (generally at 10 in FIG. 2). The assembly includes a pair of outer left hand 12 and right hand 14 housings, between which is defined an interiorly configured package space for receiving a rotationally supported component 16 which, in the illustrated embodiment, includes a shift lever sub-assembly having a rotatable disk shaped base component 17 exhibiting plurality of recessed notches for engagement by the plungers or lock arms. A more detailed description of the shifter and gear seeking mechanisms will be had with subsequent reference to FIGS. 12-36.

The notches are defined in an arcuate surface or base portion thereof and which correspond to each of Park Position (notch 18), Reverse Position (notch 20), Neutral Position (notch 22) and Drive position (notch 24). Reference is also made to rotated perspective of FIG. 8 which better depicts the arrangement of the shift handle recesses.

Also provided in the main package space are accommodations within the left hand 12 and right hand 14 mating housings for locating and supporting each of a motor actuated lock cam component 26 (also termed a shaft supported eccentric cam) and at least one lock arm or plunger 28 (a pair of which being depicted at 28A and 28B and which denote left and right individual plungers). An electric motor 30 is provided which seats within a supporting pocket 32 configured in an exterior facing side of the right hand housing 14. A rotatable output worm shaft 34 of the motor 30 actuates a further worm gear 36 which is in turn slaved to an extending end 38 of the lock cam 26. Also depicted is a motor cover 38 which assembles over the motor and gear assembly.

Prior to reference to the succeeding illustrations, an overall description of the lock system function includes motor driven cam 26 establishing a position of the lock arms or plungers 28 (such as which are spring loaded into either of a normally engaged or disengaged position relative to the mating recess notches 18, 20, 22 or 24 in the shift lever). As the shift lever 16 is rotated to a given shifter PRND position, a corresponding one of the recess notches is aligned with the plungers.

Figure 4:
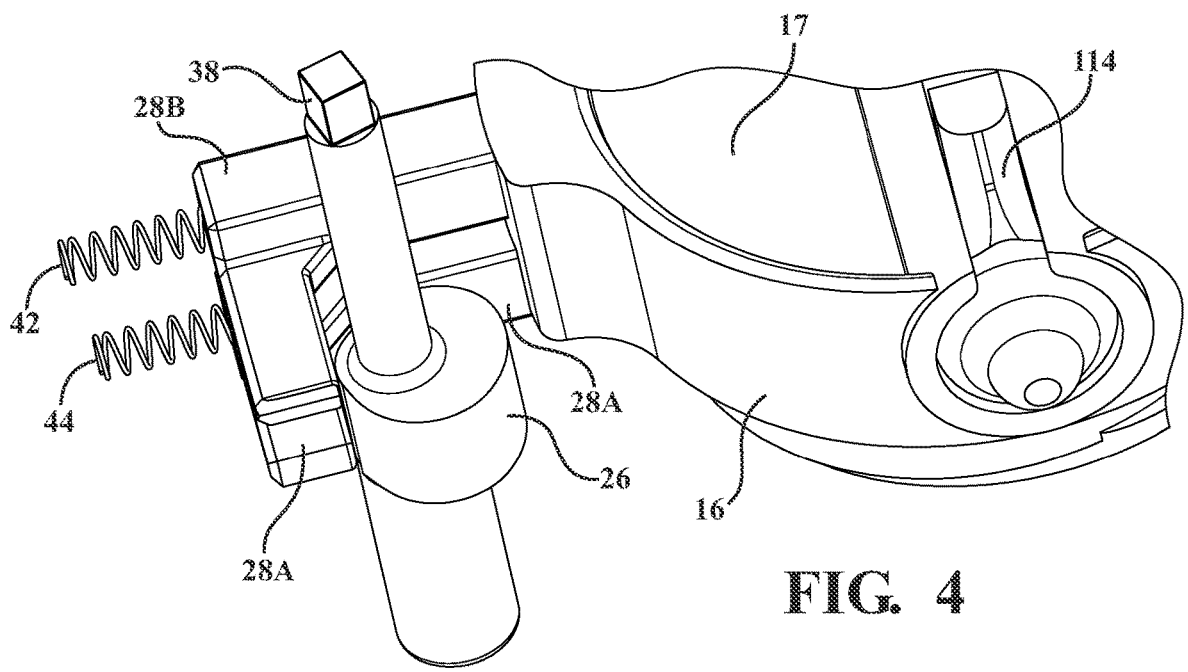
FIG. 4 is a further perspective illustrating the cam interface relationship with the plungers and which, upon rotation of the cam by the motor, results in the cam counter-biasing the spring loaded engagement of the plungers within the matching lock recesses of the shift handle in order to counter-bias retract the plunger out of engagement with the shift lever.

In the illustrated variant, and upon the cam 26 being rotated into engagement with the plungers (by example as shown in FIG. 6), the plungers retract from the shift lever recesses, thereby permitting movement (e.g. rotation) of the shifter handle. When the cam 26 is rotated in the opposite (released) position as shown in FIG. 4, the plungers or lock arms 28 are permitted to mate with the selected recessed notch or bore in the shifter handle to thereby prevent movement of the shifter.

In one non-limiting application (with subsequent reference to FIGS. 7-8 in particular) a dual plunger arrangement allows for a first plunger 28A to lock the lever into either of the Park or Neutral positions (notches 18 or 22), with the other plunger 28B being alternately configured to lock the shifter lever in either of the Reverse 20 or Drive 24 notched positions. Additional applications include the use of only a single plunger (corresponding to 28A) in the even only Park or Neutral positions are required.

Figure 11:
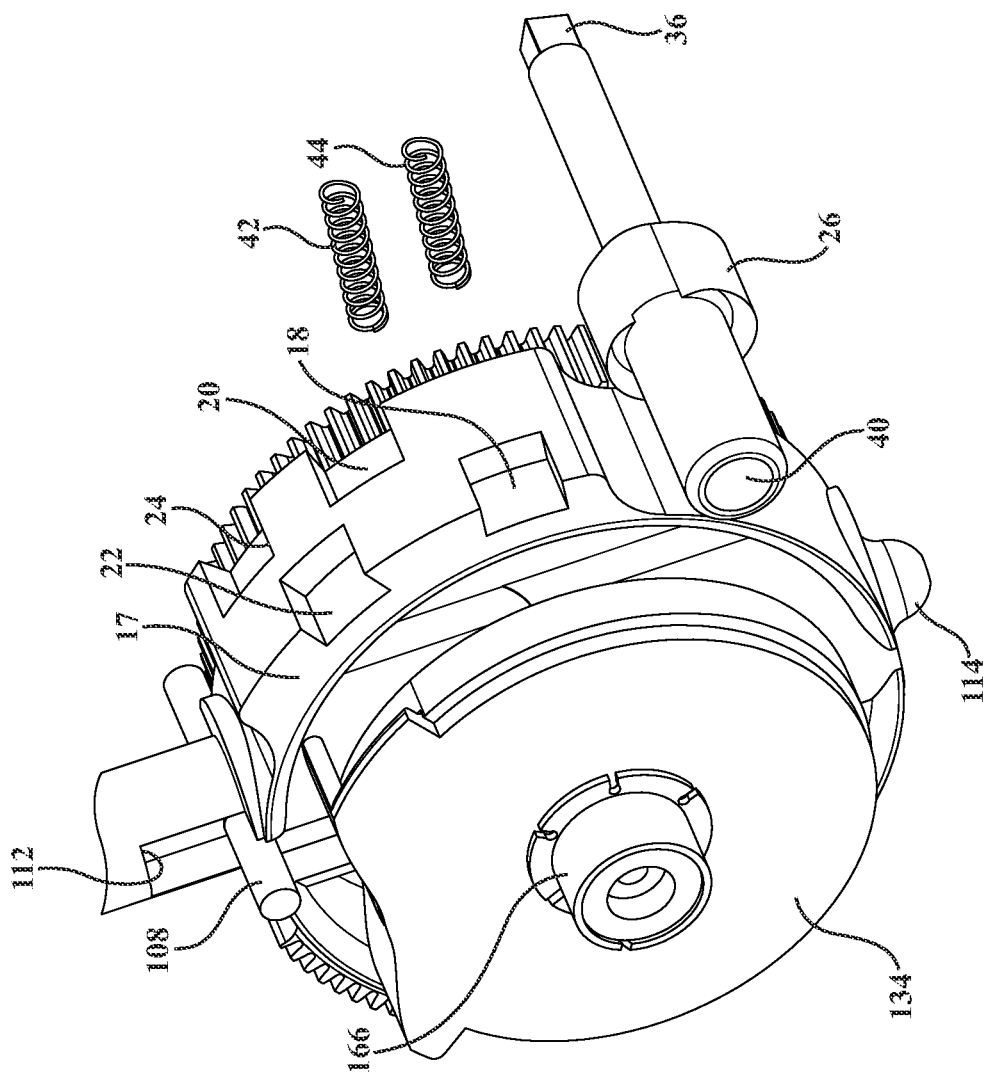
FIG. 11 is a further rotated view illustrating a cam shaft end supported magnet which, in combination with a proximately located sensor, provides a processor feedback as to a detected position of the cam.

As further described in FIG. 11, a position sensor (not shown) can be arranged in proximity to an end positioned magnet 40 associated with the rotatable lock cam 26 and by which the sensor communicates with a processor component (such as associated with a PCBA board assembly) for detecting the position of the cam. Without limitation, any arrangement of sensors (external and otherwise) can be provided in combination with the PCBA such as for providing any or park lock, neutral lock or return to park functionality.

Figure 3:
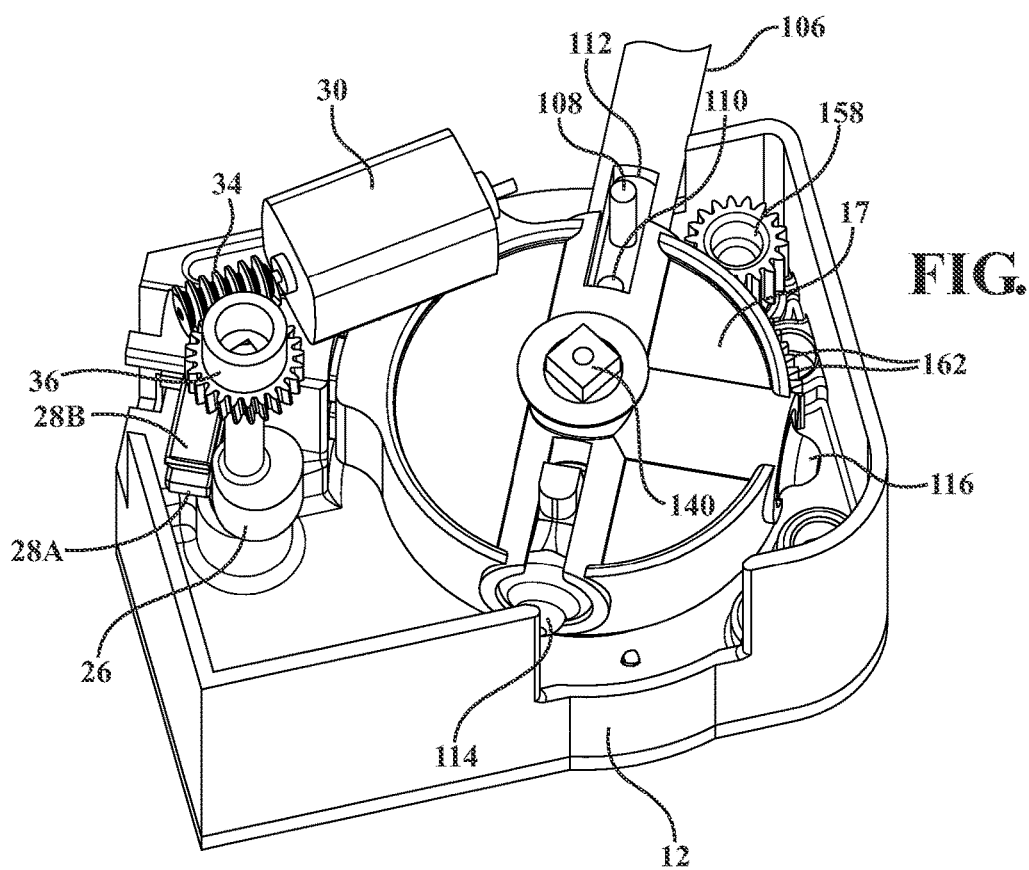
FIG. 3 is a partially assembled perspective view of the motor and gear assembly, lock cam and plungers within the left hand assembly, the plungers being in engagement with a rotatable base of the shift lever.

Referring to FIG. 3, a partially assembled perspective view is shown of the motor 30 and gear assembly (worm shaft 34, worm gear 36), slaved lock cam 26 and plungers (again generally referenced at 28 and including one more individual plungers or lock arms, these again being further again referenced at 28A and 28B). As also shown, the components are supported within the left hand assembly 12, and with the plungers being in engagement with a rotatable base of the shift lever 16 as shown.

FIG. 4 is a further perspective illustrating the cam interface relationship with the plungers 28A and 28B and which, upon rotation of the cam 26 by the motor 30, which results in the cam counter-biasing the spring loaded engagement of the plungers (see spring 42 and 44 positioned in alignment with the matching lock recesses of the shift handle) in order to counter-bias retract the plungers out of engagement with the shift lever. Also depicted in FIG. 1 are lock plunger cover screws 45 which secure proximately located lock plunger cover 43 also depicted in FIG. 1 to the left housing 12 through locations 47 depicted in FIG. 10 for biasingly and displace-ably mounting the plungers 28A/28B and associated springs 42/44 within the housing in opposing proximity to the central rotating disk 17 of the shift lever and associated shifter position recesses (left side) 18/22 and (right side) 20/24. As previously described, an alternate arrangement (not illustrated) contemplates the plungers 28A/28B being spring loaded in a normally disengaged condition relative to the shifter notches, with actuation of the cam 26 being required to seat or engage the plungers.

FIG. 5 depicts the interior component of the assembly without the motor and gear, and in order to better show the plungers or lever arms, a single one being depicted again at 28A in the locked/engaged Park 18 position (hidden from view) within the mating recesses defined in the shift lever or handle and prior to engagement by the cam. Each of the plungers or lock arms depicts an angled projection against which coacts the eccentric surface of the cam 26, and which is depicted in each of FIGS. 5-8 by projections 46 and 48 corresponding to depicted plungers 28B and 28A. As further shown, the corresponding spring 42 biases against a rear edge 48 of the indicated plunger 28B in order to bias the same into engaging contact with the selected shifter notch recess.

Proceeding to FIG. 6, a succeeding view to FIG. 5 is shown and depicts the rotation of the cam 26 eccentric surface against the plungers (28A and 28B), resulting in a counter-biasing and retracting motion (arrow 50) exerted on the plungers in order to disengage from the shift lever 16. As compared to FIG. 5, the cam 26 is rotated in either of clockwise or counter-clockwise directions in order to actuate the plunger (again shown at 28B) via its angle projecting portion 46, and in order to retract the plunger in the unseating direction to clear the surface surrounding the selected notched recesses in the shift lever, at which point the lever can be rotated.

FIG. 7 presents a further rotated view of the dual plunger arrangement 28A and 28B shown in combination with stepped recesses (again Park 18 and Neutral 22 for plunger 28A and Reverse 20 and Drive 24 for plunger 28B), again configured in the shift lever for mating with the plungers corresponding to given shifter positions. FIG. 8 is a substantial repeat of FIG. 7 and better showing cam interface 26 position for retracting the plungers 28A and 28B out of spring biased engagement within the mating recesses configured into the shift lever or handle.

FIG. 9 presents a further illustration with the plungers or lock arms removed and better showing recessed notches in the shifter lever, again corresponding to each of Park (18), Reverse (20), Neutral (22) and Drive (24) positions. FIG. 10 provides a further sectional perspective illustrating the manner in which the plungers are displace-ably supported within the left hand housing 12 (see locating pocket 52 with end aperture though which displaces engaging end faces 54A and 54B of the plungers 28A/28B (see also disengaged position of FIG. 5 depicting selected plunger 28A relative to the shift lever or handle, again upon actuation by the cam 26. FIG. 11 presents a further rotated view illustrating a cam shaft end supported magnet 40 which, in combination with a proximately located sensor, provides a processor feedback as to a detected position of the cam 26.

Figure 12:
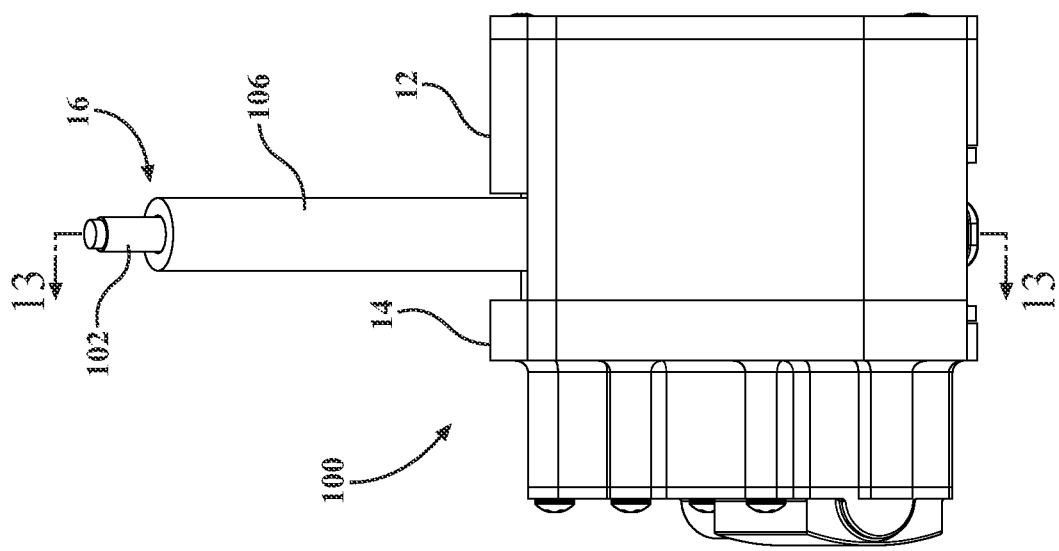
FIG. 12 is an assembled view of the gear seeking polystable shifter of FIG. 1.

Referring now to FIG. 12, an assembled view is generally shown at 100 of the gear seeking polystable shifter depicted in exploded fashion in FIG. 1 and incorporating the plunger lock mechanism along with the various shifting, gating and gear seeking mechanisms. Additional components of the shift lever assembly 16 include each of a push rod 102 and push rod spring 104 which are seated with an outer tube 106. The shifter lever is shown in FIG. 2 extending through an elongated track (see also perimeter defined edge 107) configured in the upper housing and, as further described in FIGS. 13-17, is located proximate to the positioned shifter positions configured in the housing underside. Other features include an upper gate pawl 108 and a lower gate pawl retraction pin 110 which are affixed in crosswise extending fashion through lower inserting end locations of the push rod 102.

The outer tube 106 secures to the rotatable disk shaped base component 17 (see as best shown in FIG. 3) and includes a rectangular window (see closed perimeter defining edge 112) which extends from the lowermost end of the outer tube and adjoining location of the base 17 for seating both the laterally projecting upper gate pawl 108 and lower gate pawl retraction pin 110. Upon depressing an upper projecting button end of the push rod 102 projecting from the outer tube 106, the lower gate pawl retraction pin 110 acts against the push rod spring 104 in order to downwardly displace the upper gate pawl 108 (as will be further described in order to unseat from a top underside gate location configured into the underside of the housing, this further including at least the underside lid of the main left side housing 12 as well as matching gate locations configured into the underside of the right side attachable housing 14 not shown).

Figure 17:
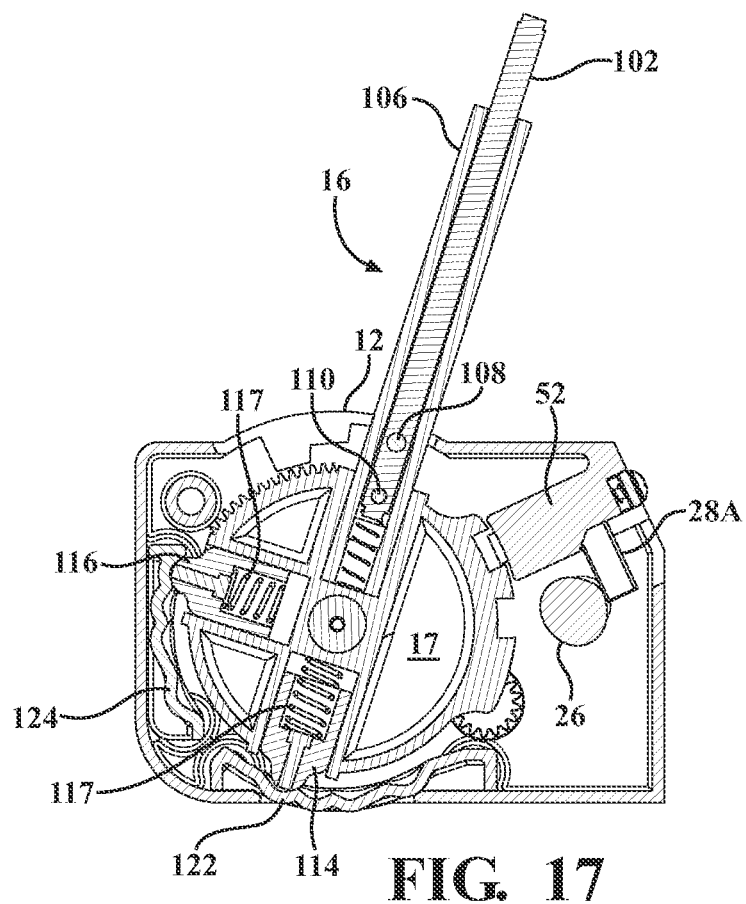
FIG. 17 presents a yet further illustration of the shifter in the Drive position, with no blockage of the gate pawl between the Neutral and Drive positions, with FIG. 17A providing a corresponding illustration to FIG. 17 with the shift lever removed for ease of illustration.
Figure 17A:
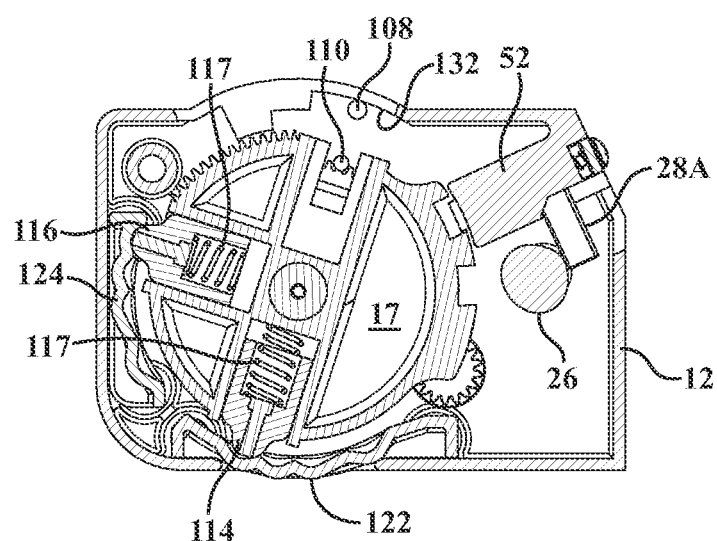
Figure 19:
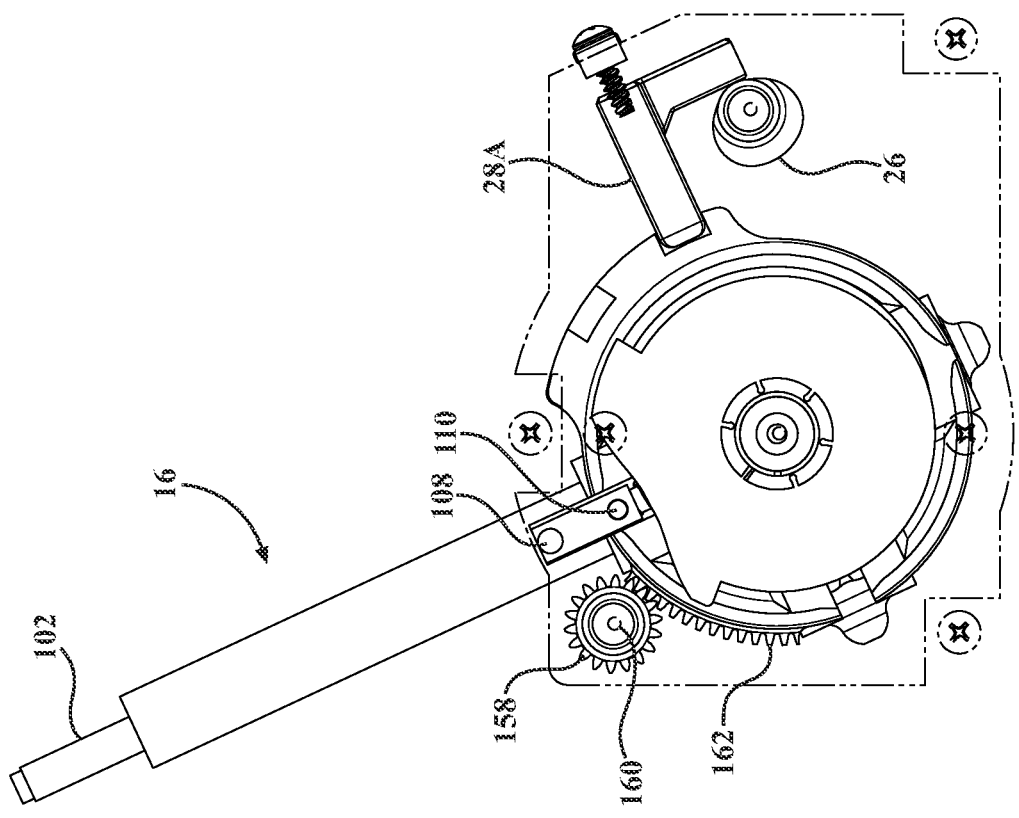
FIGS. 18 and 19 present first and second rotated and cutaway illustrations of a shift position sensing assembly including a sensor gear with an axis supported rotatable magnet positioned over a Hall effect sensor arranged on proximately positioned PCBA for monitoring and communicating the position of the shift lever.
Figure 18:
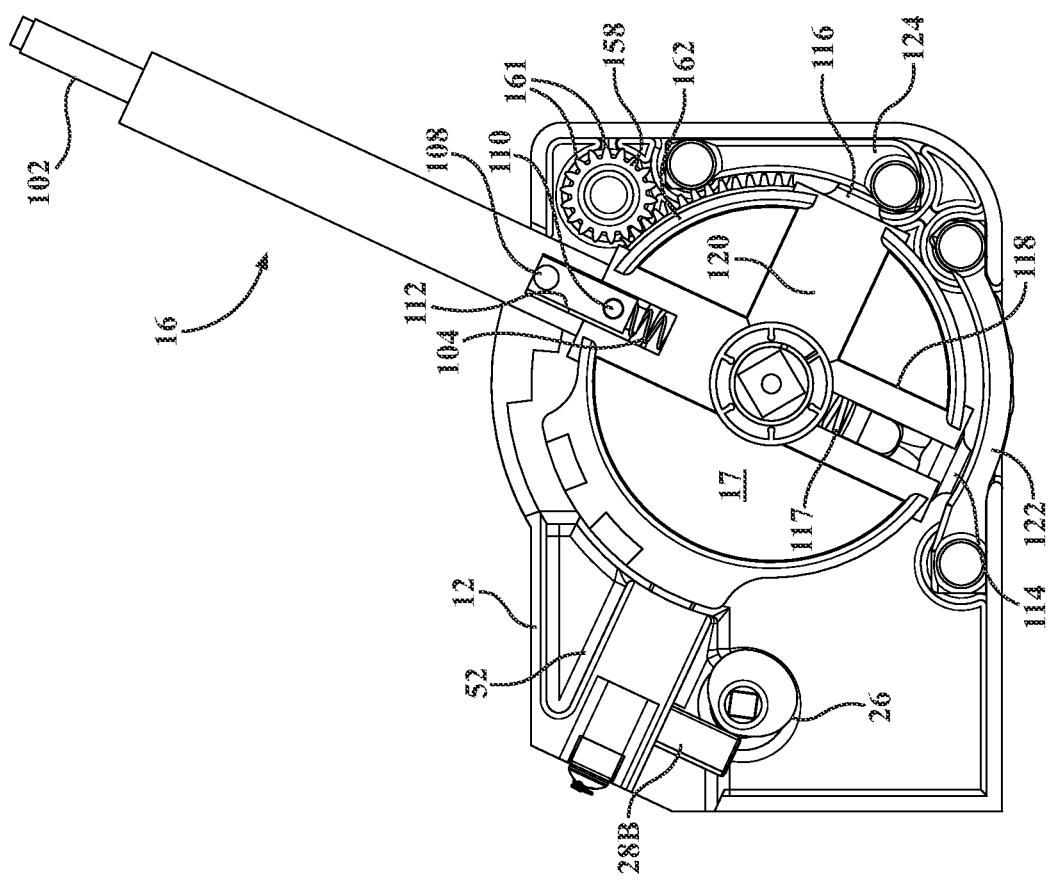
Figure 25:
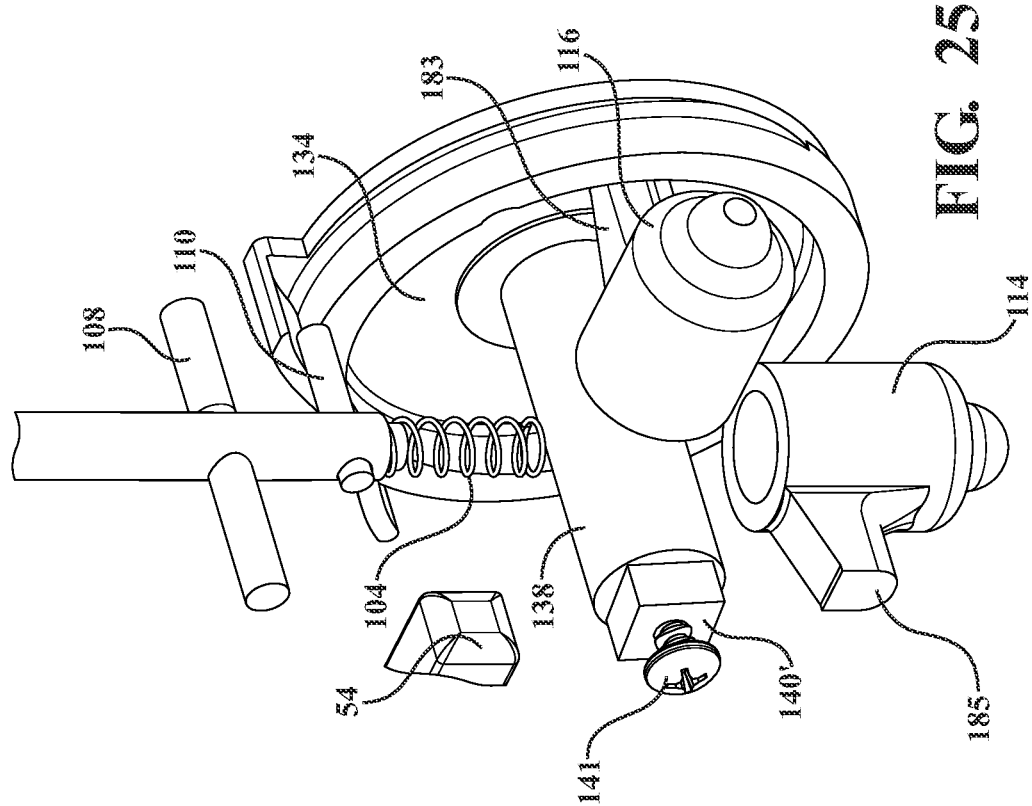
FIG. 25 is a subset assembly view of left CAM, gate pawl retraction pin and upper/lower detent pawls.

Each of a first lower detent pawl 114 and a second upper detent pawl 116 (see as best shown in FIG. 25) are incorporated into the rotatably supported disk base 17 of the shifter assembly in approximately a ninety degree offset arrangement (see as best shown in FIG. 18 cutaway), and further so that the lower detent pawl 114 is in parallel alignment with the upper seating configuration for the shift lever outer tube 106 and inner translating push rod 102. The lower 114 and upper 116 detent pawls are each seated within pockets 118 and 120 integrated into the disk base 17 (see again FIG. 18), such as with springs or the like, and so that the detent pawls 114 and 116 are biased respectively against interior facing detent plates 122 and 124 configured within the inside walls of the main left housing 12. As best shown in FIGS. 13-17A, the detent plates 122 and 124 each exhibit an undulating surface profile which, when in biased contact with the respective lower detent pawl 114 and upper 116 detent pawl (see also detent springs 117 in FIG. 1), assist in haptic engagement of the shift lever gate pawl 18 against the selected underside configured gate location configured in the left 12 and (not shown) right 14 mating housings and corresponding to each of Park gate position 126 (see FIG. 13A with shift lever removed for ease of depiction), Reverse gate position 128 (FIG. 15A), Neutral gate position 130 (FIG. 16A) and Drive gate position 132 (FIG. 17A).

Each of a left CAM 134 and right CAM 136 component are referenced in FIG. 1 as well as in succeeding FIGS. 20-26A. As shown, the CAM components are each provided as a shaft and hub (in the instance of the left component 134) or a gear shape (in the instance of the right component 136). The left CAM includes a shaft portion 138 extending from the hub defining plate 134 and projecting through a center axis of the shift lever 16 (see as best shown in cutaway of FIG. 21) and interfaces with a square profile in the right cam (see at 140 in FIG. 26) which received a likewise square shaped nut 140' (see FIG. 25) with attachment screw 141 within the right CAM axis in order to keep the left 134 and right 136 CAMs slaved together for timing of the CAM operations.

A magnet 142 is provided on the left CAM 134 axis which is located over a Hall effect sensor (not shown) located on a proximately positioned PCBA board 144 (see FIG. 1) to monitor and provide position information for the CAM components 134/136 for coordinating motor activity for the pawl retraction operations. Other features include the provision of wave springs 146 and 148 placed between each of the left CAM 134 and the rotatable base 17 of the shift lever (wave spring 146) and the right CAM 136 and shift lever base 17 (wave spring 148), this in order to eliminate lash and reduce friction during shifting operation.

Figure 20:
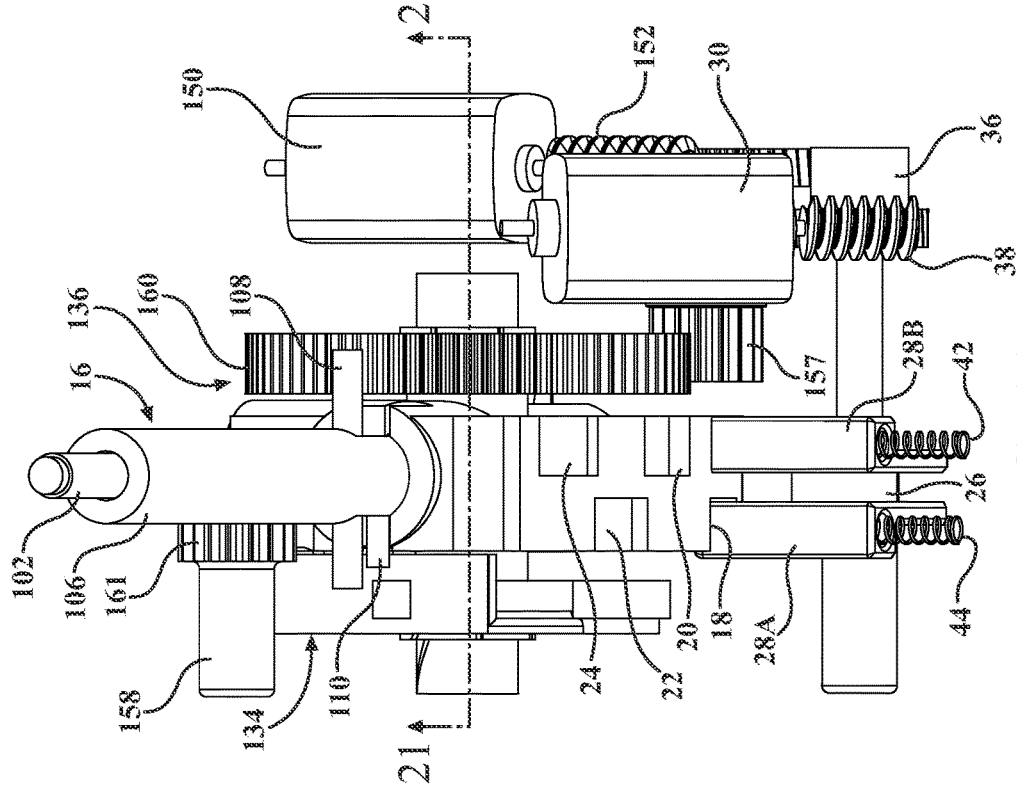
FIG. 20 is an illustration of the gear seeking shifter mechanism including right and left CAM components arranged on opposite sides of the shift lever assembly, in combination with the gear seeking motor with worm for actuating the right and left CAM components, in combination with the rotatable cam actuation motor with worm for retracting the plungers.
Figure 24:
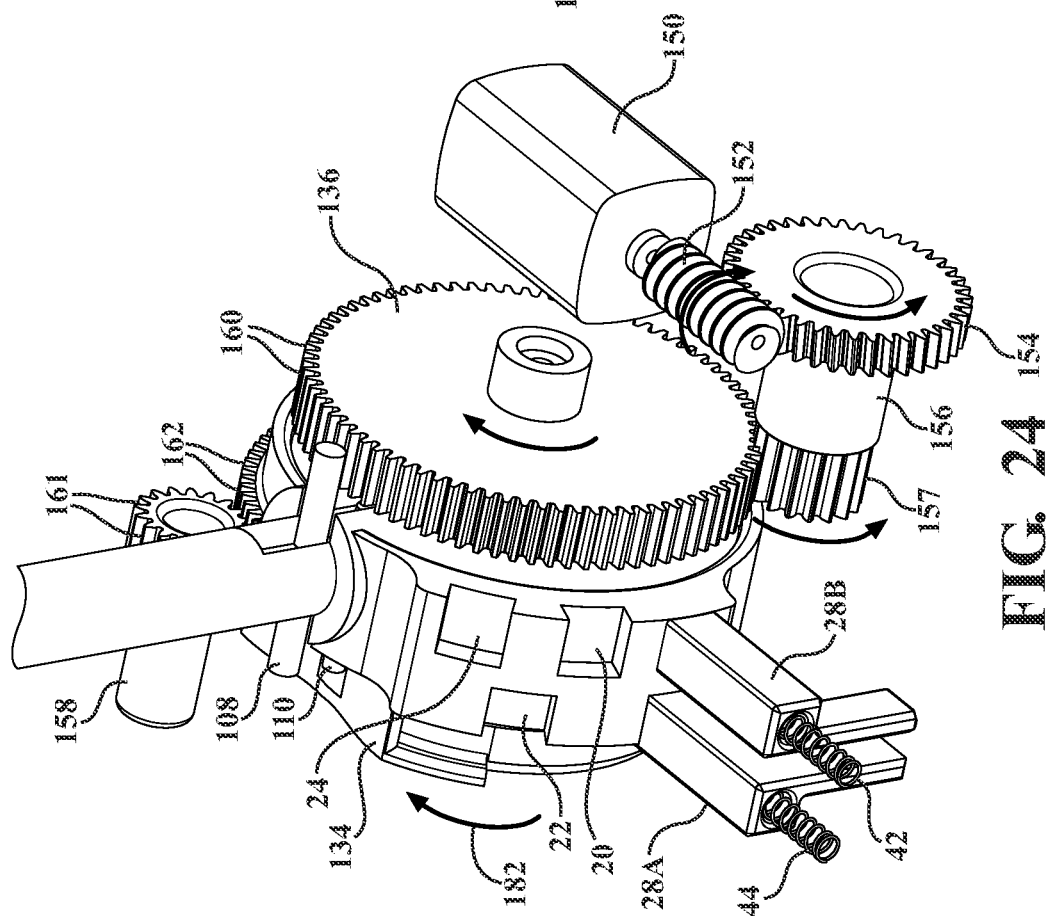
FIG. 24 is a rotated perspective of FIG. 20 and showing the right CAM connected to the gear seeking worm gear, which in turn includes a spur gear profile at one end and interfacing with the right CAM, the worm gear further having an enlarge opposite diameter end for interfacing with the worm on the gear seeking motor assembly.

A gear seeking motor 150 with extending worm 152 (see as best shown in FIG. 24 in combination with FIG. 1) is provided separate from the cam lock motor 30 with worm 34 (see also FIG. 20). The gear motor worm 152 engages an enlarged annular diameter gear profile 154 of a gear seeking worm gear 156. As best shown in FIG. 24, the opposite end of the gear seeking worm gear 156 exhibits a separate exterior annular spur gear profile 157, which inter-engages with exterior annular threads 160 on the right CAM 136. In this manner, and upon activating the gear seeking motor 150, the gear seeking worm gear 156 in turn rotatably drives the right CAM 136, along with the left CAM 134 via the square interface 140 and screw 141.

Figure 23:
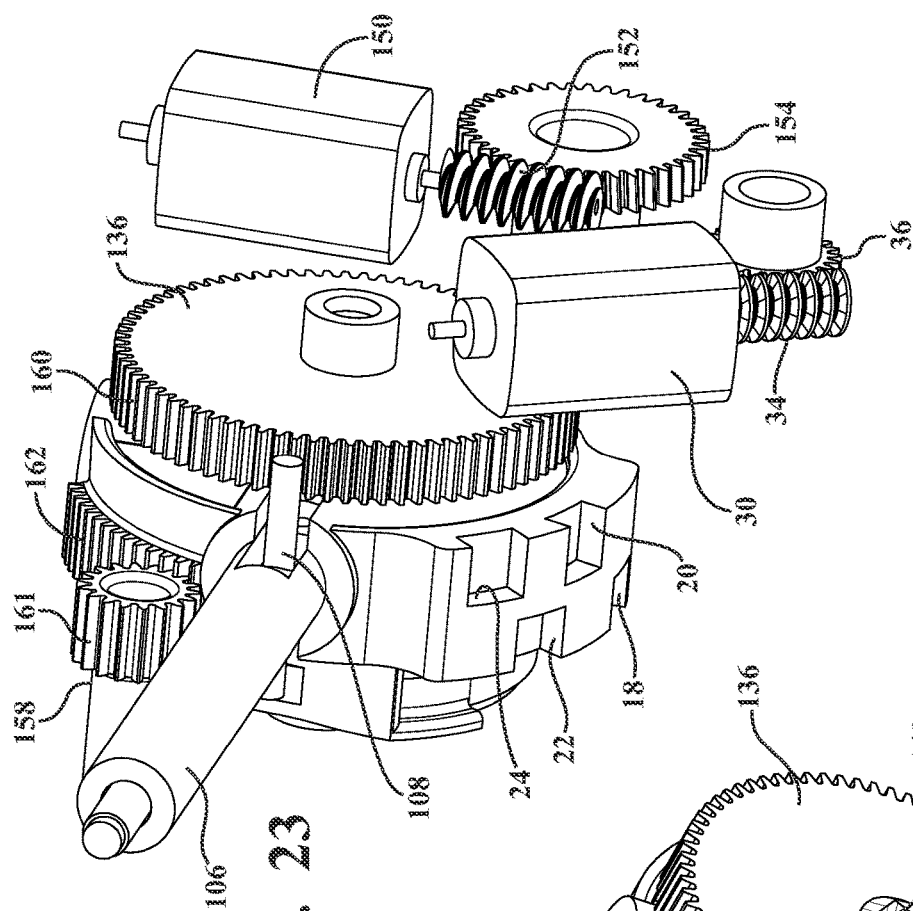
FIGS. 22 and 23 present a pair of rotated views of the shifter and right/left CAM components including the left CAM shaft which protrudes through the center axis of the shift lever to interface with the right CAM for slaving the left and right CAMs together for timing of CAM operations.

A shift position sensor gear 158 (see FIG. 1 along with FIGS. 18-24) is provided with an axis supported magnet 160 (FIG. 19) and includes an enlarged diameter end with an outer gear profile 161 which interfaces with the opposing outer gear profile 162 on the shift lever rotatable disk body 17 (see as best shown in FIG. 23). The teeth of the shift position sensor gear 158 coact with exterior teeth 159 configured upon the rotating body 17 of the shifter and, in this manner, and upon the rotation of the shift lever, the gear 158 is likewise caused to rotate and so that the sensor magnet 160 positioned over the Hall effect sensor on the PCBA 144 (FIG. 1) causes a change of voltage read by the sensor in order for the PCBA to monitor and communicate the position of the shift lever.

Additional components referenced in FIG. 1 include shift axis bushings 164 and 166 which seats over each of the right CAM 136 and left CAM 138. Also depicted is a cam screw 168 positioned between the right housing 14 and right CAM 136, along with an outer PCBA cover 170 and screws 172 for attaching to the PCBA 144. Securing of the package assembly is further provided by each of pluralities of PCBA cover screws 174 at a left exterior along with motor cover screws 176 securing the motor cover 38 to the right housing at the right exterior of the assembly.

Figure 21:
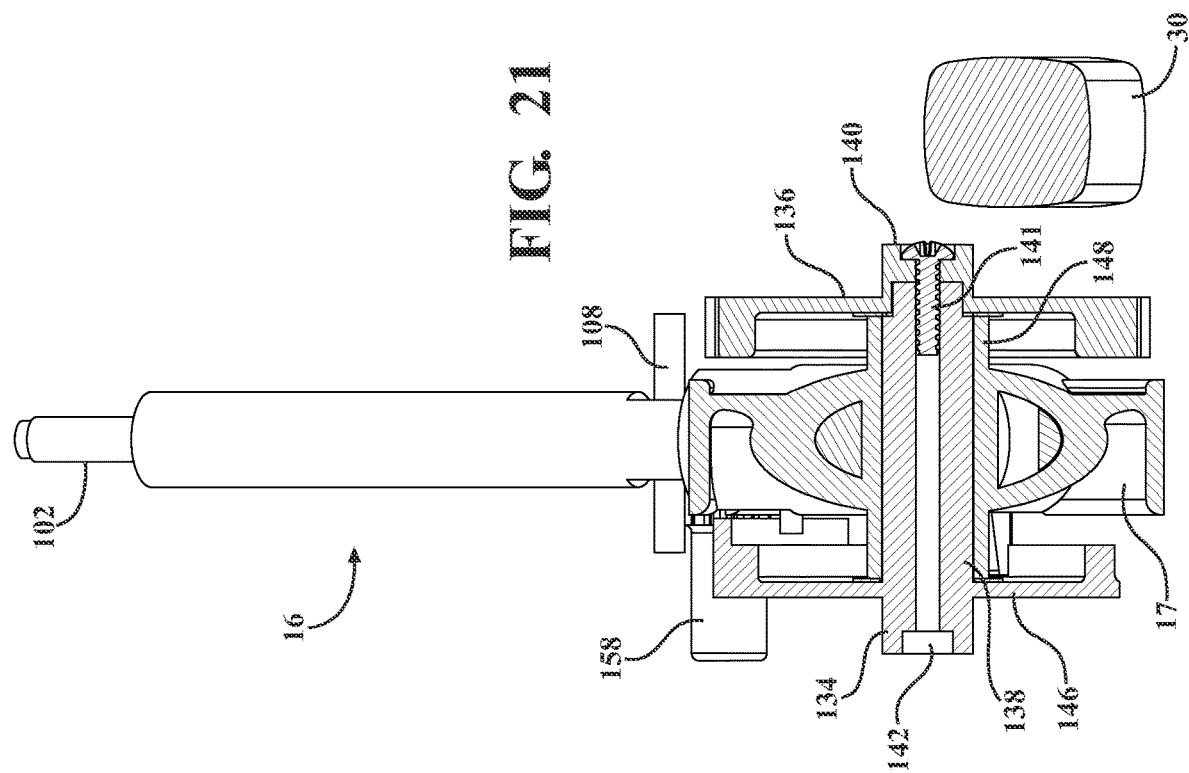
FIG. 21 is a cutaway view of FIG. 20 and better illustrating the arrangement of the left and right CAM held together with a screw and which permit the shift lever to rotate during normal operation without forcing rotation of the CAMs.

FIG. 20 again provides an illustration of the gear seeking shifter mechanism including the right 136 and left 134 CAM components arranged on opposite sides of the shift lever assembly, this again in combination with the gear seeking motor 150 with worm 152 for actuating the right and left CAM components, in combination with the rotatable cam actuation motor 30 with worm 34 for retracting the plungers 28A/28B. FIG. 21 is a cutaway view of FIG. 20 and better illustrating the arrangement of the left 134 and right 136 CAM held together with the screw 141 and which permit the shift lever to rotate during normal operation without forcing rotation of the CAMs 134/136.

Figure 22:
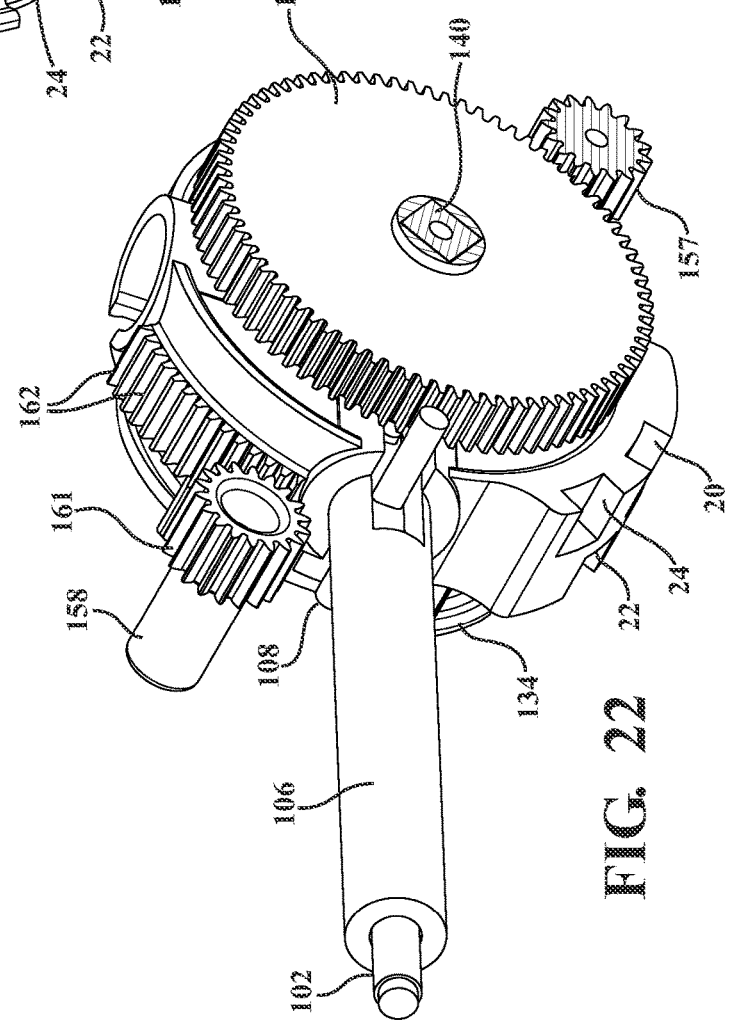

FIGS. 22 and 23 present a pair of rotated views of the shifter and right 136/left 134 CAM components, again including the left CAM shaft 138 which protrudes through the center axis of the shift lever to interface with the right CAM 136 for slaving the left and right CAMs together for timing of CAM operations. FIG. 24 is a rotated perspective of FIG. 20 and showing the right CAM 136 connected to the gear seeking worm gear 156, which in turn includes the spur gear profile 157 at one end and interfacing with the right CAM, the worm gear further again having the enlarged opposite diameter end 154 for interfacing with the worm 152 on the gear seeking motor assembly 150.

Figure 25A:
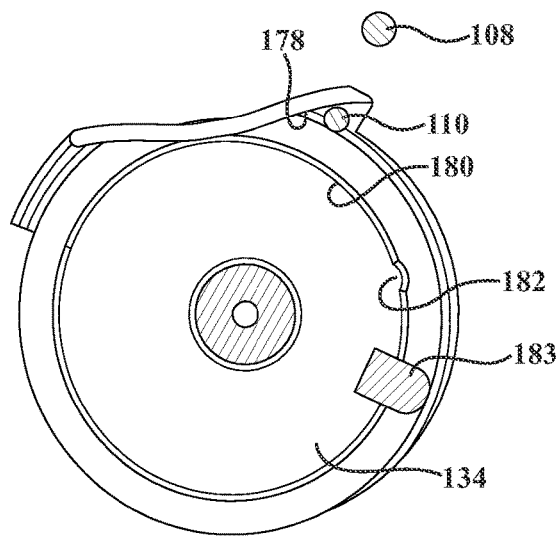
FIG. 25A is a rotated plan view of the left CAM in FIG. 25 and showing the profile locations for interacting with the gate pawl retraction pin and detent for receiving the upper detent pawl.
Figure 26:
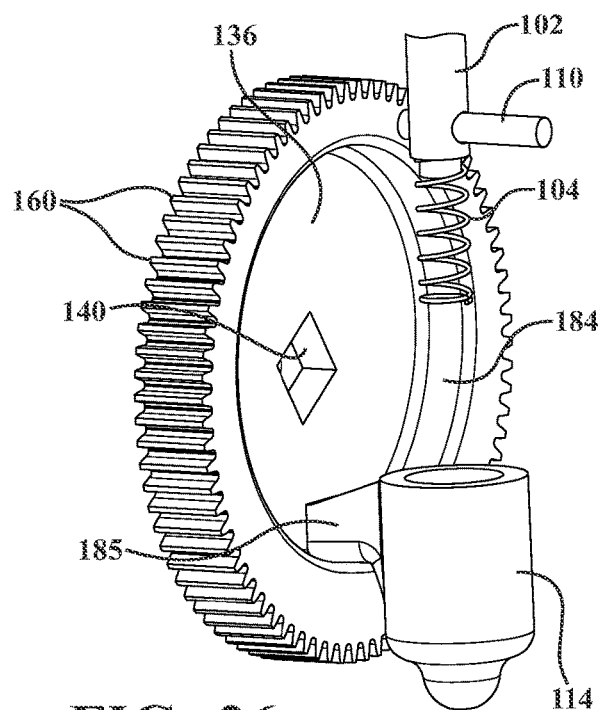
FIG. 26 is a subset assembly of the right CAM with CAM profile for interacting with the lower detent pawl.
Figure 26A:
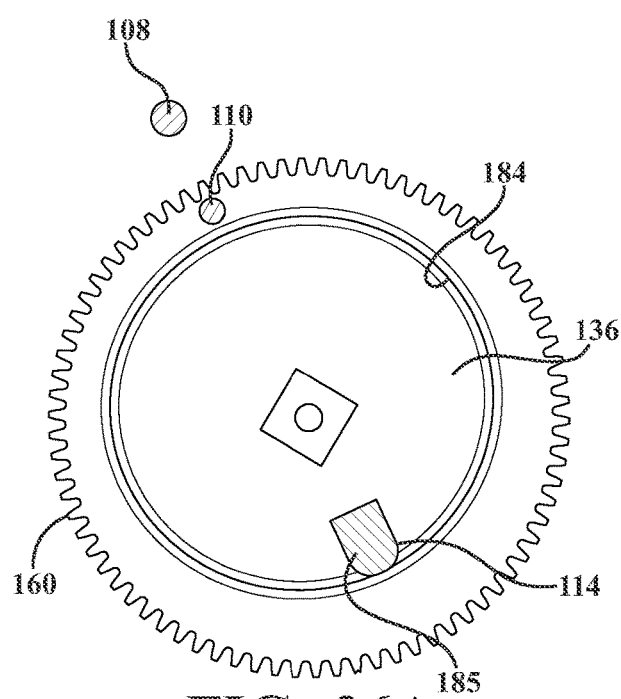
FIG. 26A is rotated plan view of the right CAM depicted in FIG. 26.

FIG. 25 is a subset assembly view of left CAM 134, upper gate pawl 108, gate pawl retraction pin 110 and upper 116 and lower 114 detent pawls and which, in combination with FIGS. 25A, 26 and 26A, provide a clearer description of the slaved rotating interface of the left 134 and right 136 CAMs for in turn actuating the upper 116 and lower 114 detent pawls, in combination with the retraction of the upper gate pawl 108. Referring to the rotated plan view FIG. 25A of the left CAM 134, it exhibits two profiles, depicted at 178 and 180, for respectively interacting with the gate pawl retraction pin 110 and the upper detent pawl 116, such as upon rotation of the left CAM 134 (such as in a ccw direction as noted at 182 in FIG. 24).

In this fashion, the first (upper) profile 178 interacts with the gate retraction pin 110 in order to pull the upper gate pawl 108 inward in order to clear the gates. These again correspond to each of the Park gate position 126 (see FIG. 13A with shift lever removed for ease of depiction), the Reverse gate position 128 (FIG. 15A), the Neutral gate position 130 (FIG. 16A) and the Drive gate position 132 (FIG. 17A).

Concurrently, the second left CAM profile 180 interacts with the upper detent pawl 116 and includes a detent 182 for receiving the upper detent pawl, as well as assisting in rotating the shift lever 16 forward and providing additional resistance between the left CAM 134 and upper detent pawl arm (see at 183 in FIG. 25) in order to overcome system friction between the CAMs 134/136 and the shift lever assembly. As further shown in FIG. 26 and corresponding rotated plan view of FIG. 26A, a subset assembly of the right CAM 136, a single CAM profile 184 is provided for interacting with a lower detent pawl arm 185 for interacting with the lower detent pawl 114. In this manner, the rotation of the left 134 and right 136 CAMs causes inward displacement of both the upper 116 and lower 114 detent pawls relative to the opposing and floor 122 and side 124 detent plates configures within the left housing 12 in order to assist with shifting operation.

Figure 13:
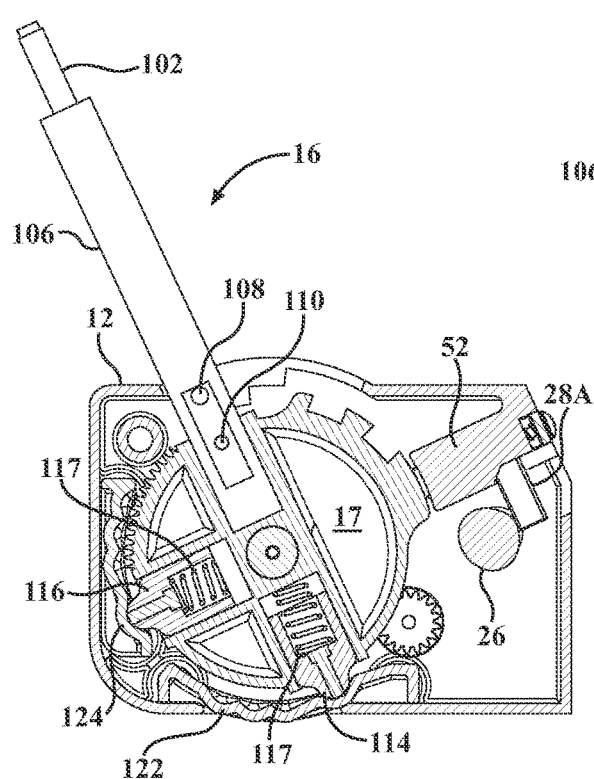
FIG. 13 is a cutaway taken along line 13-13 in FIG. 12 and depicting the shifter in the Park position with the upper gate pawl blocked by the shifter gate, with FIG. 13A providing a corresponding illustration to FIG. 13 with the shift lever removed for ease of illustration.
Figure 13A:
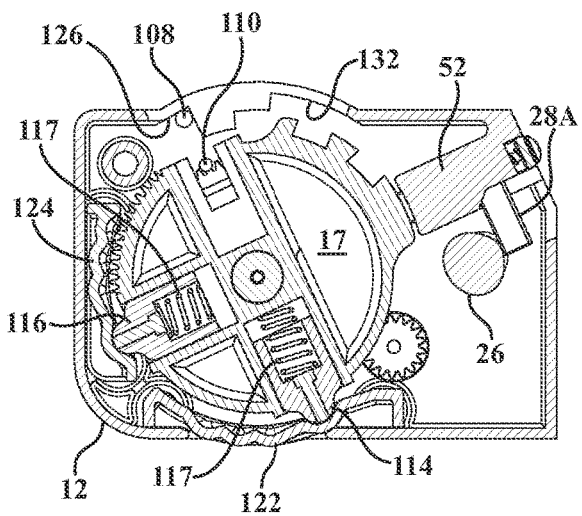

Referring back to FIG. 13, a cutaway taken along line 13-13 in FIG. 12 depicts the shifter in the Park position (at 126 in FIG. 13A) with the upper gate pawl blocked by the shifter gate, with FIG. 13A providing a corresponding illustration to FIG. 13 with the shift lever removed for ease of illustration.

Figure 14:
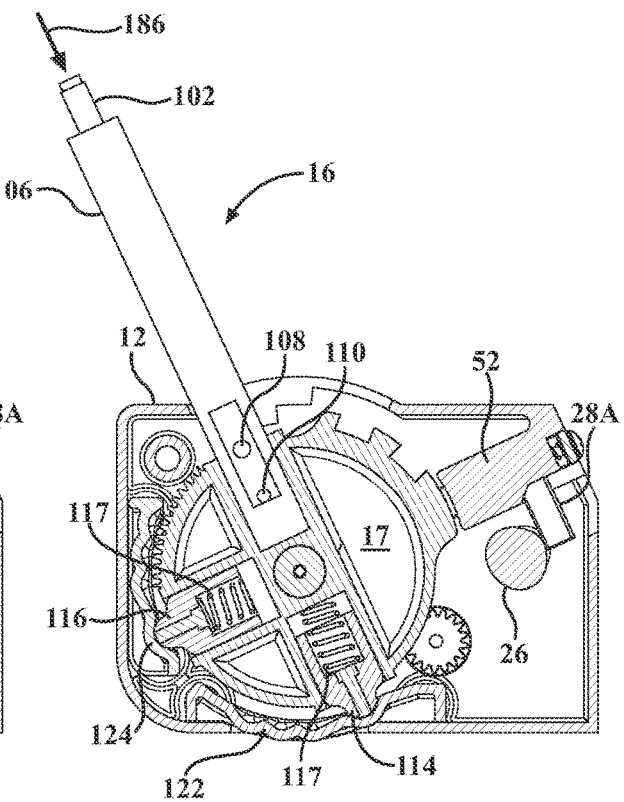
FIG. 14 is a succeeding view to FIG. 13 and showing the shifter in the Park position, with gate pawl not blocked by the gate resulting from the shift knob button being pressed, pushing down on the shift rod so that the gate pawl clears the gate wall, with FIG. 14A providing a corresponding illustration to FIG. 14 with the shift lever removed for ease of illustration.
Figure 14A:
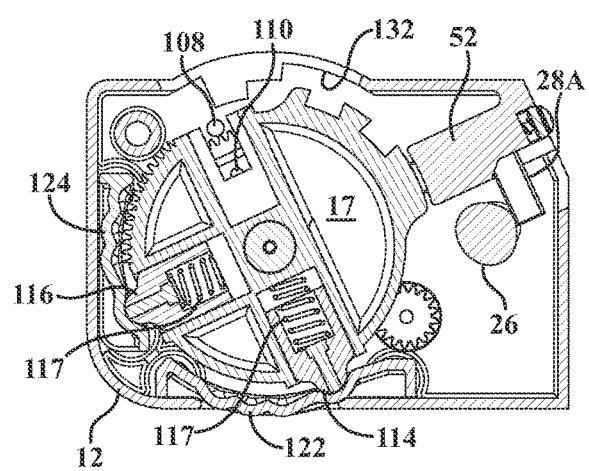

FIG. 14 is a succeeding view to FIG. 13 and showing the shifter again in the Park position 126, with the gate pawl 110 not blocked by the Park gate 128, and resulting from the shift knob end of the shift rod 102 being pressed (see arrow 186 in FIG. 14) against the underneath located compression spring 104, thereby pushing down on the shift rod so that the gate pawl 110 clears the gate wall at the Park gate position 128, with FIG. 14A providing a corresponding illustration to FIG. 14 with the shift lever removed for ease of illustration.

Figure 15:
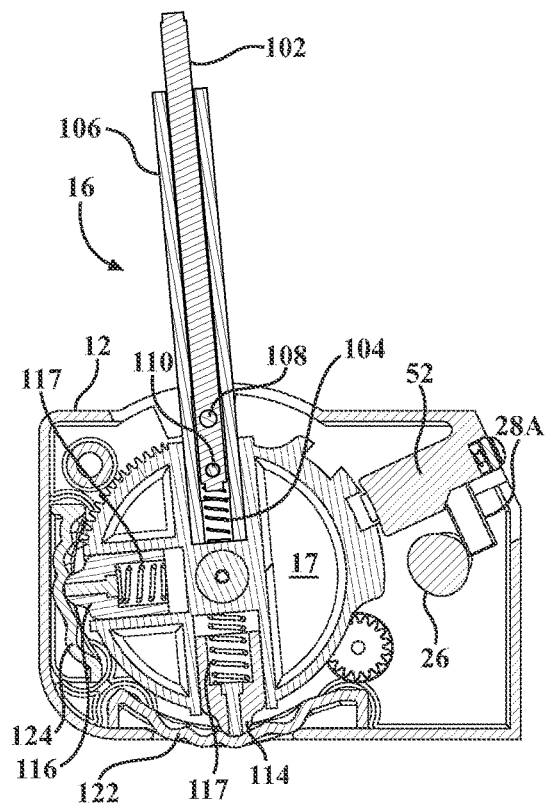
FIG. 15 is a succeeding view to FIGS. 13-14 with the shift lever rotated to the Reverse position, with the gate pawl blocked by the gate wall between the Reverse and Park positions, with FIG. 15A providing a corresponding illustration to FIG. 15 with the shift lever removed for ease of illustration.
Figure 15A:
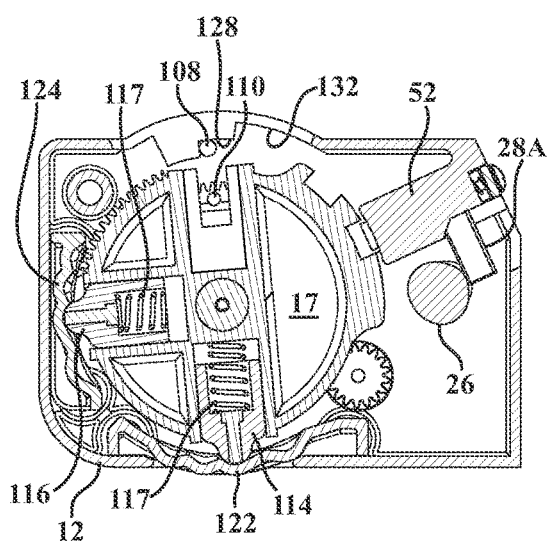

FIG. 15 is a succeeding view to FIGS. 13-14, with the shift lever rotated to the Reverse gate position (again at 128), with the gate pawl 110 blocked by the gate wall between the Reverse (128) and Park (126) positions, and with FIG. 15A providing a corresponding illustration to FIG. 15 with the shift lever removed for ease of illustration. In this manner, the gate pawl 110 allows or restricts shift lever motion, depending upon whether or not the shift button at the end of the inner rod 102 is depressed. The push rod spring 104 in turn biases the push rod 102 outward in the absence of the button being depressed, forcing the gate pawl 110 to also bias toward the outside of the shifter.

Figure 16:
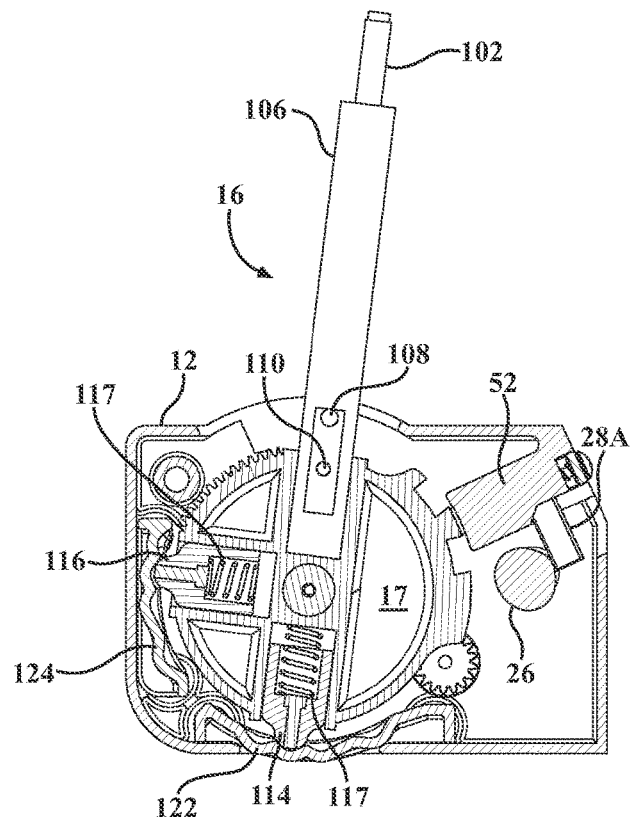
FIG. 16 is a further succeeding cutaway illustration depicting the shifter in the Neutral position with the gate pawl blocked by the gate wall between the Neutral and Reverse positions, with FIG. 16A providing a corresponding illustration to FIG. 16 with the shift lever removed for ease of illustration.
Figure 16A:
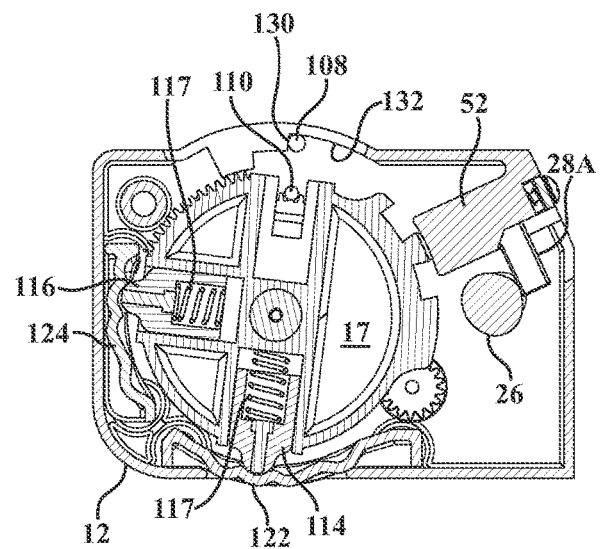

FIG. 16 is a further succeeding cutaway illustration depicting the shifter in the Neutral gate position (130), with the gate pawl 110 blocked by the gate wall between the Neutral (130) and Reverse (128) positions, and with FIG. 16A providing a corresponding illustration to FIG. 16 with the shift lever removed for ease of illustration.

FIG. 17 presents a yet further illustration of the shifter in the Drive gate position 132, with no blockage of the gate pawl 110 between the Neutral (130) and Drive (132) positions, with FIG. 17A providing a corresponding illustration to FIG. 17 with the shift lever removed for ease of illustration.

As previously described, this arrangement permits the use of non-equidistant spacing between the various gate positions 126, 128, 130 and 132. Shifting effort is also restricted by the condition of the lock plungers which are actuated based on vehicle parameters (brake pressed, ignition on, etc). The shifting effort is also dependent upon the profile of the detent plates 122/124, along with the spring rate of the detent springs and the material differences between the detent pawls 114/116 and the detent profile of the detent plates 122/124.

Figure 27:
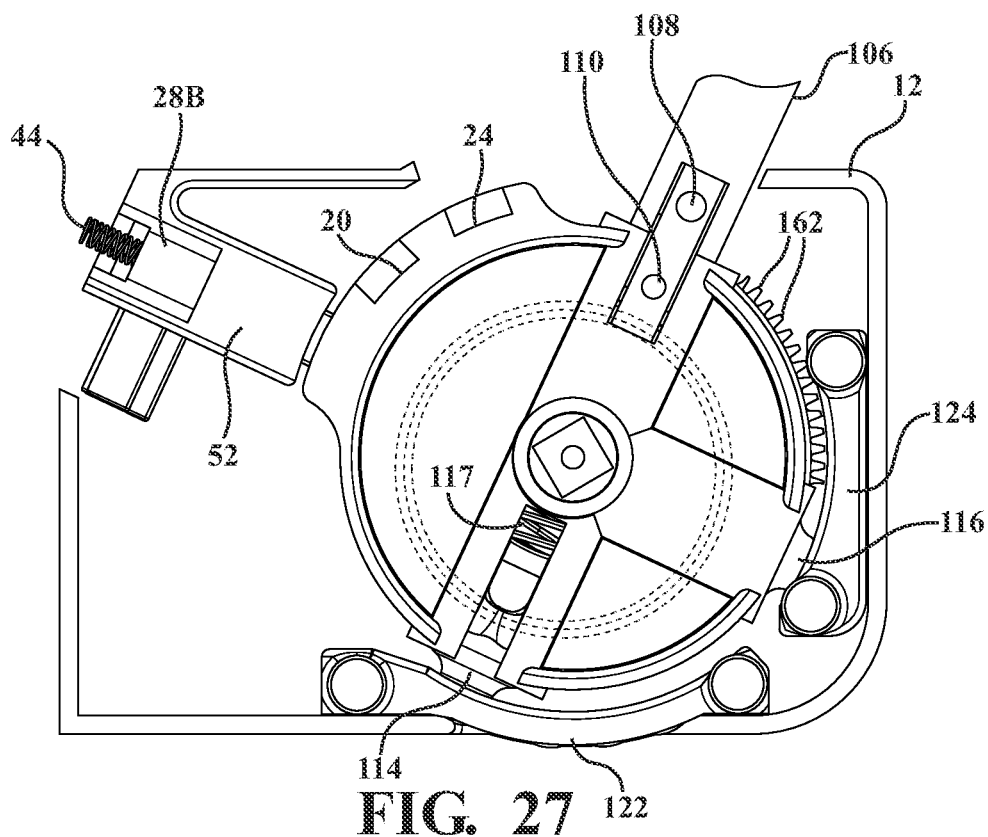
FIGS. 27-28 depict each of right and left side plan views of the gear seeking shifter assembly, corresponding to that previously depicted in FIGS. 13-13A, and showing each of the lower detent pawl, upper detent pawl and gate pawl in outward engaged positions along with the spring loaded and cam actuated plungers engaged to the shifter to lock the shift lever.
Figure 28:
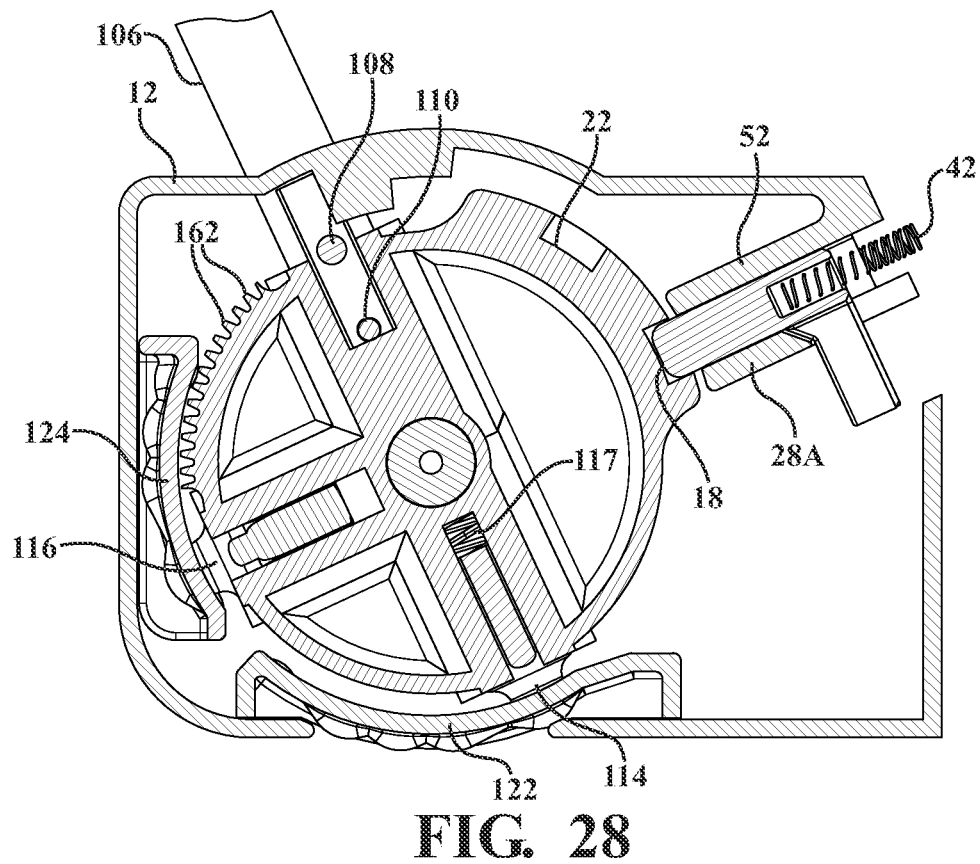

By further description, FIGS. 27-28 depict each of right and left side plan views of the gear seeking shifter assembly, corresponding to that previously depicted in FIGS. 13-13A, and showing each of the lower detent pawl 114, upper detent pawl 116 and gate pawl 108 in outward engaged positions along with the spring loaded and cam actuated plungers 28A/28B engaged to the shifter to lock the shift lever.

Figure 29:
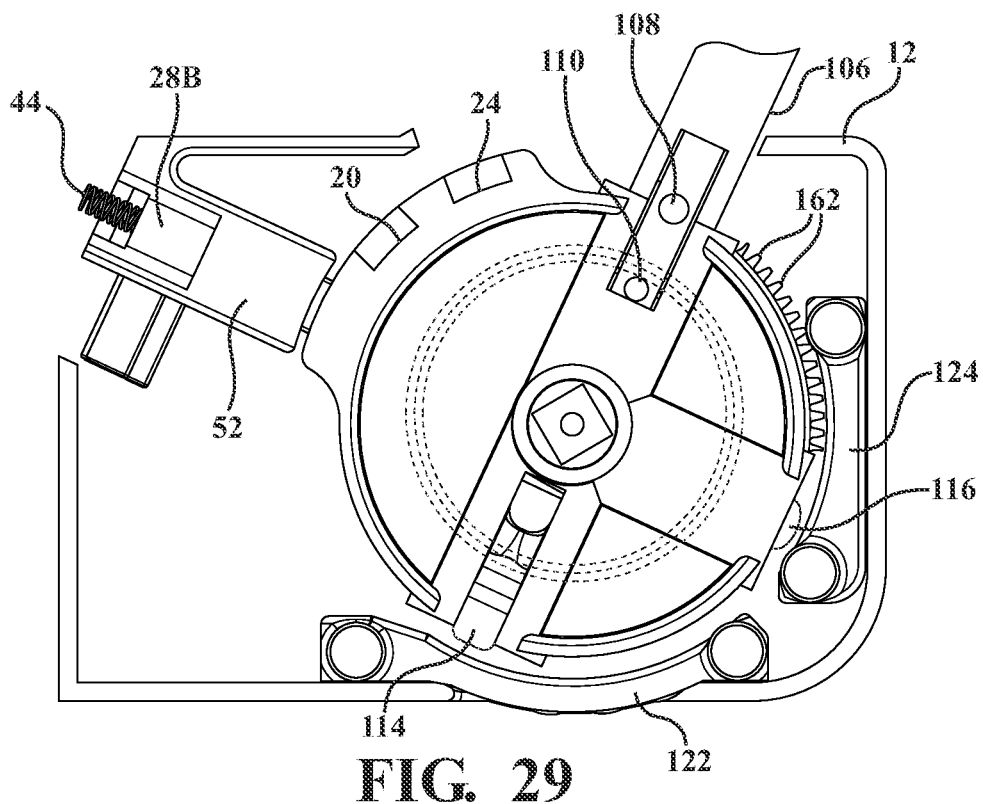
FIGS. 29-30 present corresponding right and left CAM views to FIGS. 27-28 and illustrating the actuation of the gear seeking motor for rotating the CAMS in order to retract the gate and detent pawls and which, upon the PCBA recognizing that the CAM is in the proper position (through signal from magnet/Hall sensor), deactivates the gear seeking motor with the plunger arms still engaged with the shifter handle.
Figure 30:
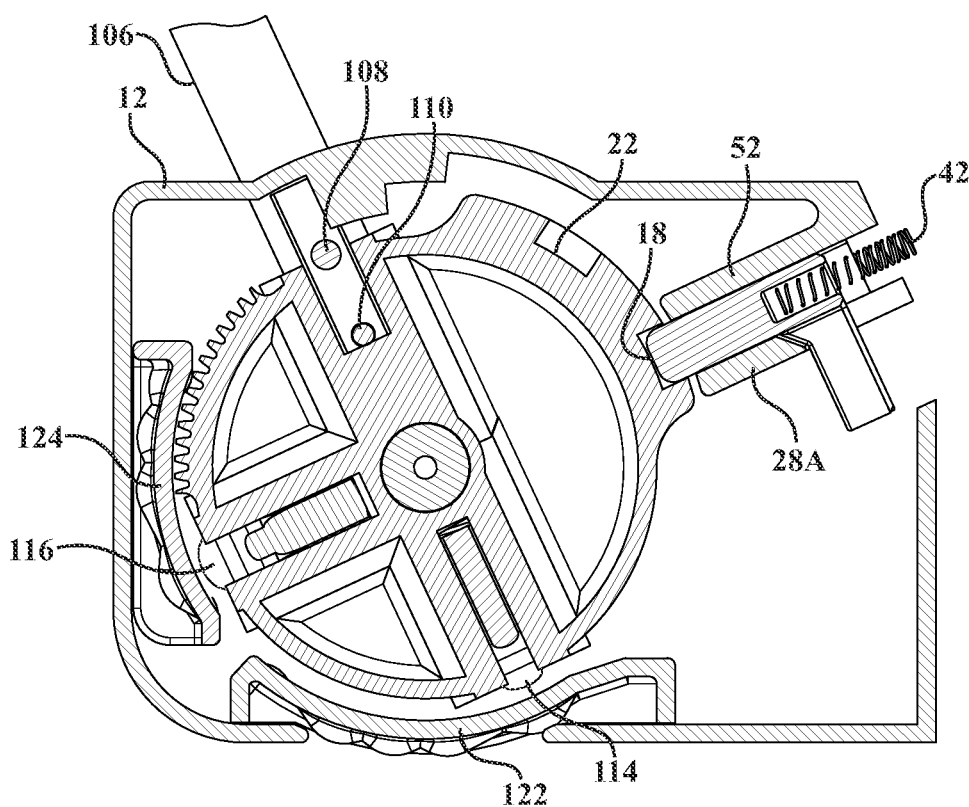

With reference to FIGS. 29-30, and upon a gear seeking operation being communicated to the shifter from the vehicle transmission/ECU, the lock system is initiated to lock the shift lever 16 as previously described in the description of the plunger lock mechanism of FIGS. 1-11. FIGS. 29-30 present corresponding right and left CAM views to that depicted in FIGS. 27-28 and illustrating the actuation of the gear seeking motor 150 for rotating the left/right CAMs 134/136 in order to retract the gate pawl 108 and detent pawls 114/116 and which, upon the PCBA 144 recognizing that the CAMs (via left CAM 134) are in the proper position (through signal from magnet 160/Hall sensor), deactivates the gear seeking motor with the plunger arms 28A/28B still engaged with the shifter handle.

Figure 31:
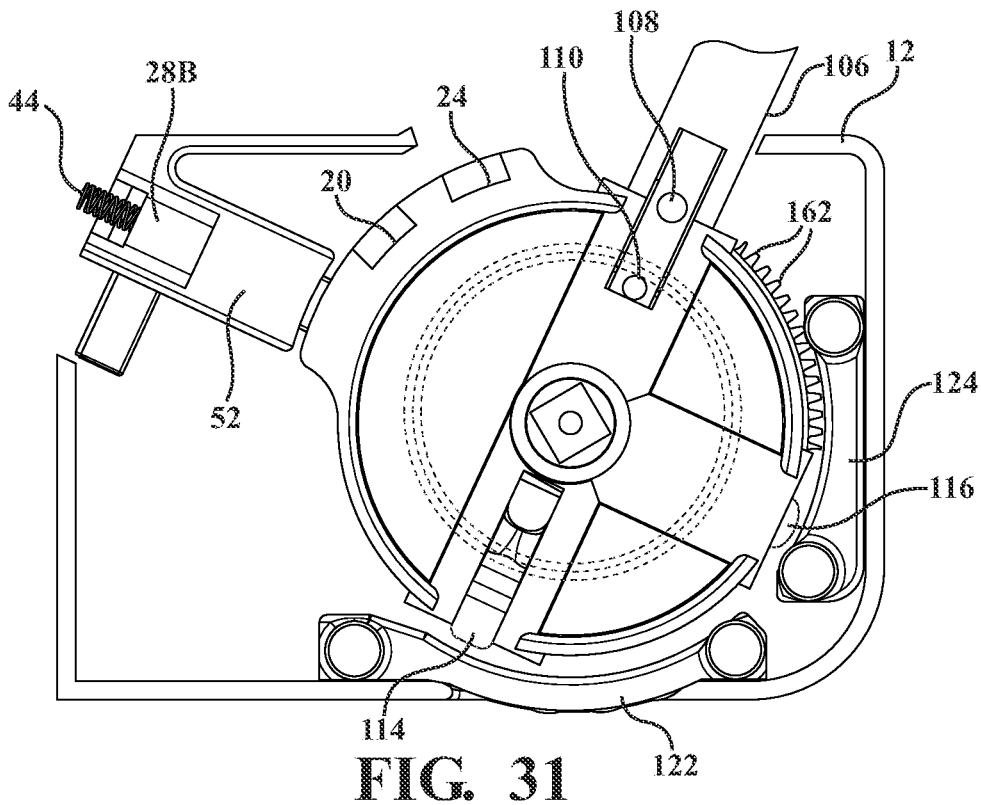
FIGS. 31-32 present corresponding right and left CAM views succeeding that shown in FIGS. 29-30 and by which the lock motor is actuated to unlock the shift lever through retraction of the spring loaded plungers or lock arms.
Figure 32:
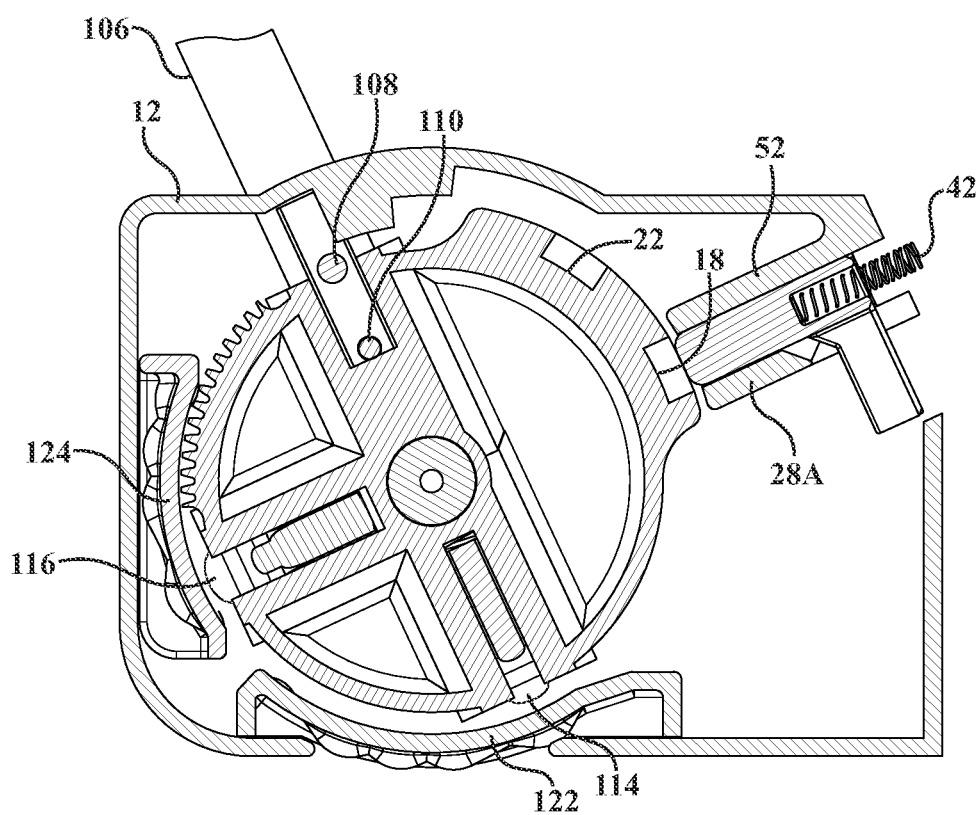
Figure 33:
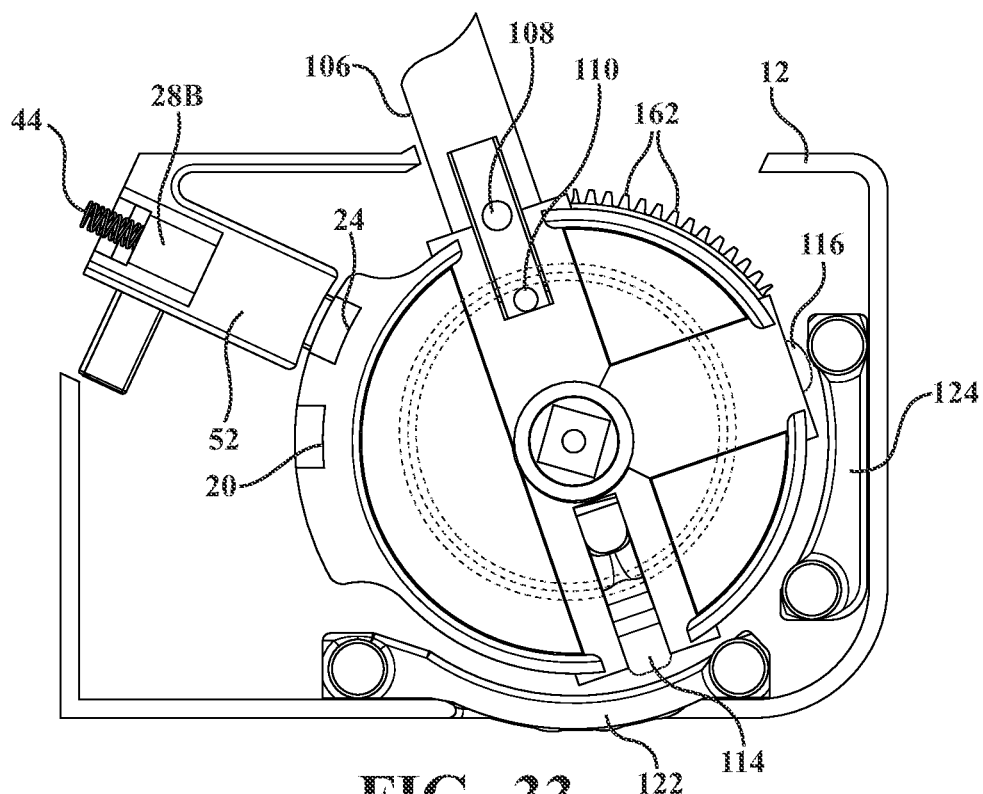
FIGS. 33-34 present corresponding right and left CAM views succeeding that shown in FIGS. 31-32 and showing the gear seeking motor again being actuated to rotate in either direction to move the shift lever from a current position to a further position directed by the vehicle transmission/ECU, at which point both CAMs and shift lever rotate to the desired position, such as the drive position as shown and which, upon the PCBA recognizing that the shift lever is at the desired position (again through interfacing of the magnet/Hall effect sensor) the gear seeking motor is deactivated.
Figure 34:
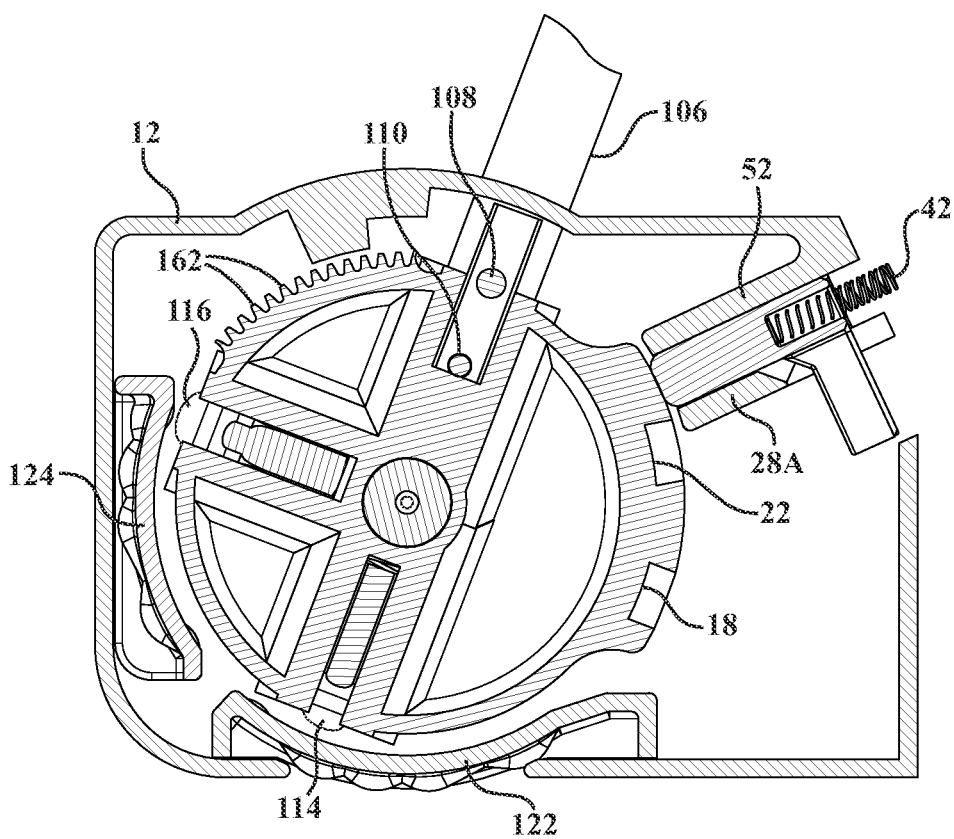

FIGS. 31-32 present corresponding right and left CAM views of a succeeding that shown in FIGS. 29-30 and by which the lock motor 30 is actuated to unlock the shift lever 16 through retraction of the spring loaded plungers or lock arms 28A/28B. FIGS. 33-34 present corresponding right and left CAM views of succeeding that shown in FIGS. 31-32 and showing the gear seeking motor 150 again being actuated to rotate in either direction to move the shift lever (via the slaved CAM's 136/134) from a current position to a further position directed by the vehicle transmission/ECU, at which point both CAMs and shift lever rotate to the desired position (see arrow 188 in FIG. 34), such as the drive gate position 132 as shown and which, upon the PCBA 144 recognizing that the shift lever is at the desired position (again through interfacing of the magnet/Hall effect sensor) causes the gear seeking motor to be deactivated.

Figure 35:
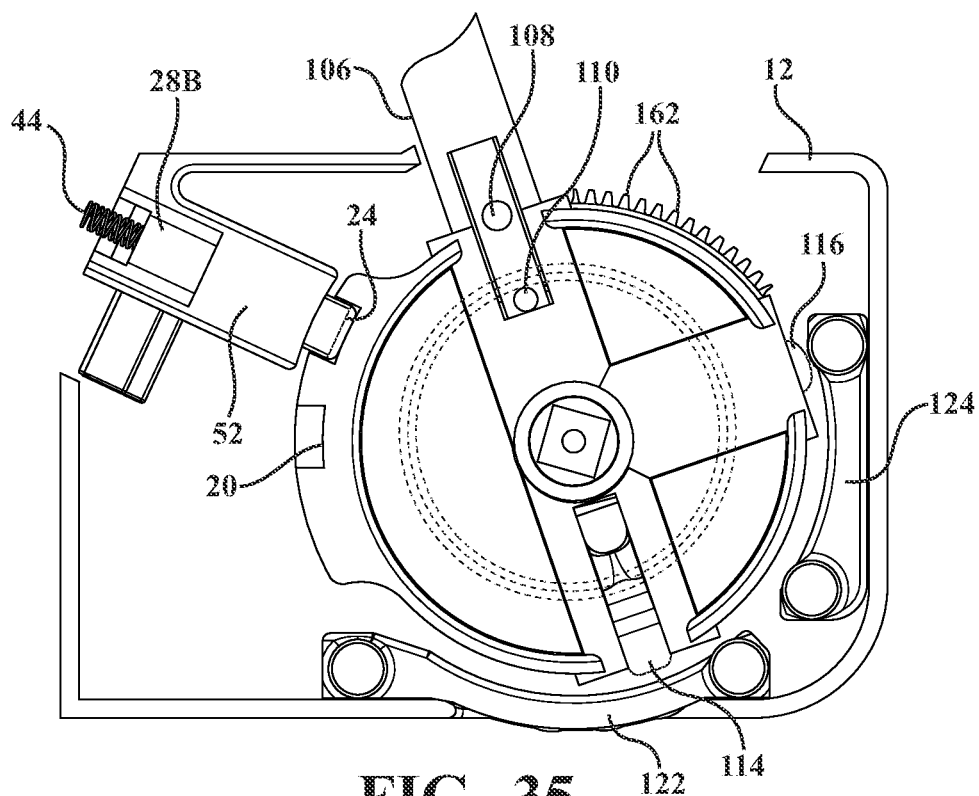
FIGS. 35-36 correspond to and succeed FIGS. 33-34 and further depicting the lock system being reengaged (through cam rotated re-engagement of the plungers) at whichever position is sought and in order to stop shift lever assembly movement.
Figure 36:
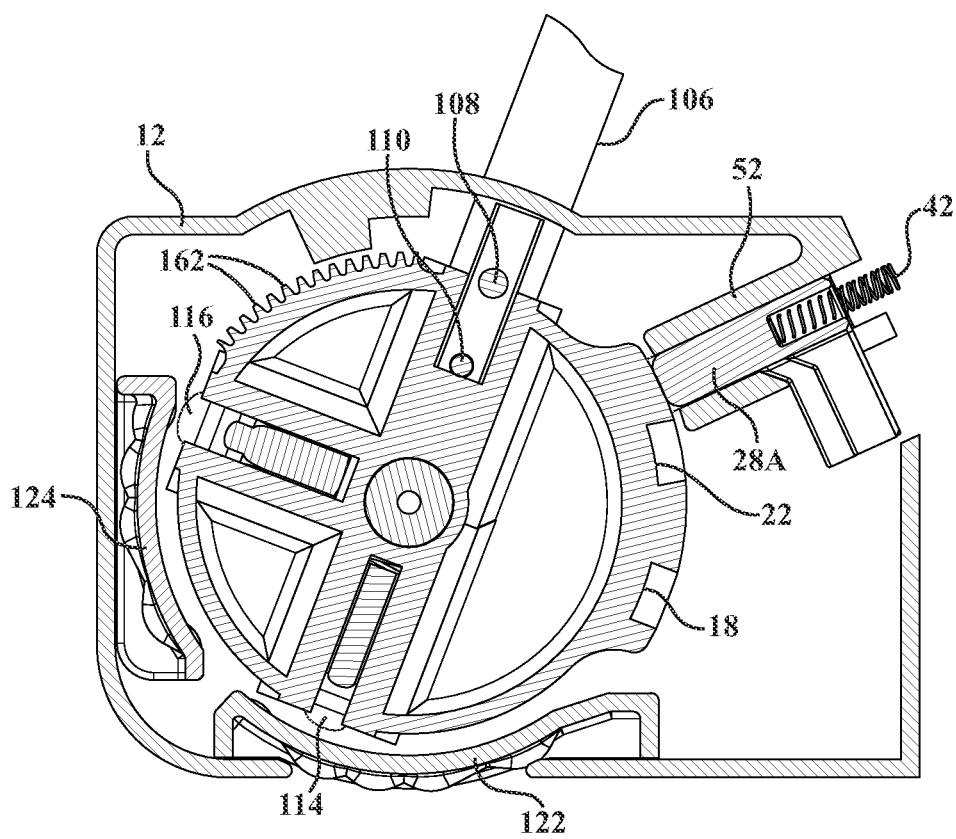

FIGS. 35-36 correspond to and succeed FIGS. 33-34 and further depicting the lock system being reengaged (through cam rotated re-engagement of the plungers 28A/28B) at whichever position is sought and in order to stop shift lever assembly movement at whichever position is sought.

Figure 37:
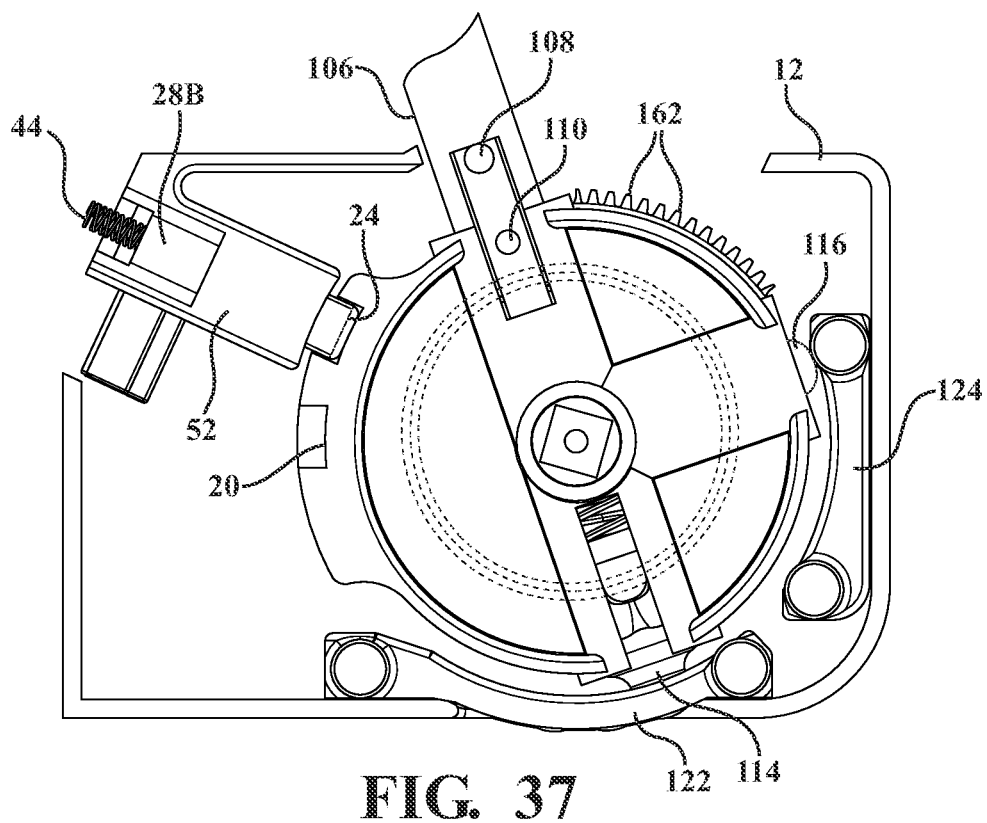
FIGS. 37-38 present a yet further pair of right and left side plan views of the gear seeking shifter assembly and showing the gear seeking motor actuated to rotate the CAMs to reset the position of the detent pawls and gate pawl and which, upon the PCBA recognizing that the CAM is at the reset (standard shift operating) position, the gear seeking motor is deactivated, thereby completing the gear seeking operation.
Figure 38:
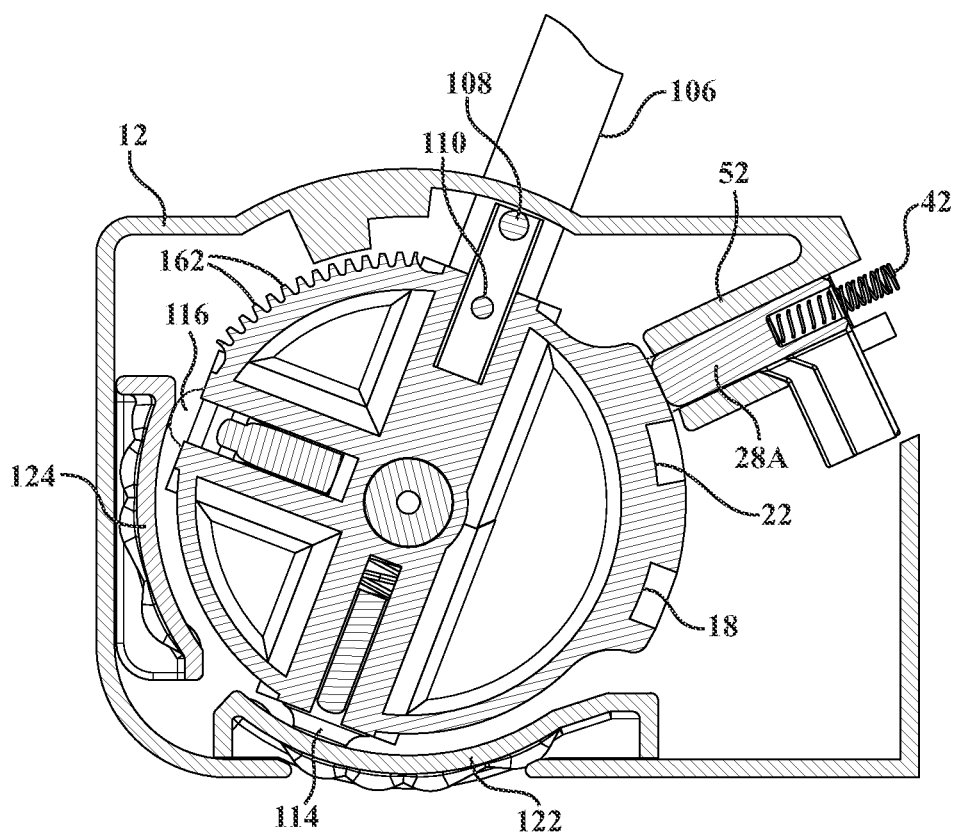

FIGS. 37-38 present a yet further pair of right and left side plan views of the gear seeking shifter assembly and showing the gear seeking motor 150 actuated to rotate the CAMs 134/136 to reset the position of the detent pawls 114/116 and upper gate pawl 108 and which, upon the PCBA 144 recognizing (again via magnet 160 and PCBA mounted Hall effect sensor) that the CAM 134 is at the reset (standard shift operating) position, the gear seeking motor 150 is deactivated, thereby completing the gear seeking operation.

As previously described, gear seeking is performed based on vehicle ECU or transmission command. In order to gear seek, the shifter must have the ability to perform the action when commanded, such as in autonomous driving modes including parallel parking operations which require the shifter gear position to mirror the transmission gear position during the autonomous parking operation. Alternatively, and in the instance of a problem with the transmission, the vehicle may command the shifter move to a safe status (such as Park or Neutral).

Other considerations include that the user prefer no detent sounds be heard during gear seeking. As such, the detent pawl to detent plate interface must move together, be disconnected from one another, or remain stationary while the shifter lever rotates to the commanded position. In the present invention, the detent pawls 114/116 are retracted by the CAM profiles as previously described in FIGS. 25-26, and which when rotated retract the pawls so that they do not interface with the detent profiles (at 180 on the left CAM 134 and at 184 on the right CAM 136) so that there is no shift/bump sound heard as the shift lever rotates between positions.

In operation, the shift lever is held in position using the lock mechanism previously described and to allow the gear seeking motor to continue to rotate and move the shift lever to the commanded position. Once the position is found, and autonomous commands are no longer necessary, the lock plunger is engaged into whichever gear the lever is positioned, with the CAMs 134/136 rotated to reset the engagement of the gate pawl 108 and detent pawls 114/116, thereby ending the gear seeking operation and restoring standard shift functionality.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A gear seeking shifter, comprising:
a housing containing a shift lever having a rotatable base and an extending tube;
a depressible inner push rod supported within and extending from said tube;
a gate pawl secured to said inner push rod which is upwardly biased into contact with any of PRND shifter position gates configured along an underside of said housing proximate an elongated track through which said shift lever extends;
said rotatable base of said shift lever further including a plurality of notches configured within an arcuate surface and corresponding to said PRND shifter position gates;
a lock motor configured to rotate a shaft supported eccentric cam extending within said housing, said eccentric cam actuating at least one plunger having an extending portion aligning with a selected one of said notches and such that, upon rotation of said eccentric cam by said lock motor, said plunger being caused to displace to a disengaged position to permit gear seeking rotation of said shift lever;

a CAM component rotatably supported to said base, said CAM component being driven by a gear seeking motor;

at least one detent pawl incorporated into said rotatable base in biasing contact with a detent plate configured upon an opposing inside surface of said housing; and said CAM component, upon being rotated by said gear seeking motor, displacing said detent pawl away from contact with said detent plate to permit said CAM component to rotate said shift lever between gear positions.

2. The shifter of claim 1, said CAM component further comprising a left CAM component including each of a first profile for retracting said gate pawl from a selected one of said shifter position gates and a second profile for engaging and inwardly displacing said detent pawl from said detent plate.

3. The shifter of claim 2, further comprising a shift position sensor gear with end support magnet rotatably slaved to said left CAM component, a printed circuit board assembly (PCBA) mounted within said housing in proximity to said sensor gear and including a sensor opposing a shaft end supported magnet of said sensor gear for instructing rotation of said gear seeking motor.

4. The shifter of claim 2, said CAM component further comprising a right CAM component slaved to said left CAM component, said left CAM component located on a first side of said rotatable base and said right CAM component arranged on an opposite side of said rotatable base.

5. The shifter of claim 4, said at least one detent pawl engaged by said left CAM component further comprising an upper detent pawl, said at least one detent pawl further including a lower detent pawl actuated by rotation of said right CAM component, said detent plate further including a floor plate opposing said lower detent pawl and a side plate opposing said upper detent pawl.

6. The shifter of claim 4, said gear seeking motor further comprising a worm engaging a gear seeking worm gear for driving said right CAM component and slaved left CAM component.

7. The shifter of claim 1, further comprising a gate pawl retraction pin secured to said push rod below said upwardly biased gate pawl, a push rod spring seated within a pocket in said outer tube for upwardly biasing said gate pawl and push rod.

8. The shifter of claim 1, said housing further comprising inter-assemblable left and right housing portions.

9. The shifter of claim 1, said lock motor further comprising a worm shaft actuating a worm gear, said eccentric cam including an extending end in slaved relationship with said bevel gear so that actuation of said lock motor causes rotation of said eccentric cam.

10. The shifter of claim 9, said at least one plunger further comprising each of a first plunger in aligning relationship with a first pair of said notches defining Park and Neutral shifter locations and a second plunger in aligning relationship with a second pair of said notches defining Reverse and Drive positions associated with said lever shifter rotatable base.

11. The shifter of claim 10, further comprising first and second coil spring for biasing said first and second plungers in an engaged position relative to said shifter.

12. The shifter of claim 11, further comprising a magnet supported upon an end of said shaft supported eccentric cam and, in response to rotation relative to a proximately located sensor, detecting a position of said eccentric cam.

13. A gear seeking shifter, comprising:

a housing defining a package receiving interior and containing a shift lever with a rotatable base and outer tube supporting an upwardly extending and depressible inner push rod;

a left CAM component and a slaved right CAM component arranged on opposite sides of said rotatable base, said CAM components being driven by a gear seeking motor;

a gate pawl secured to said inner push rod and upwardly biased into contact with any of PRND shifter position gates configured along an underside of said housing proximate an elongated track through which said shift lever extends;

a lower detent pawl and an upper detent pawl incorporated into said rotatable base and in biasing contact with floor and side detent plates configured upon opposing inside surfaces of said housing, said upper detent pawl actuated by rotation of said left CAM component and said lower detent pawl actuated by rotation of said right CAM component; and upon said CAM components being rotated by said gear seeking motor, said left CAM component including a first profile for retracting said gate pawl from a selected one of said shifter position gates and a second profile for engaging and inwardly displacing said upper detent pawl away from contact with said side detent plate, said slaved right CAM component including a further profile for inwardly displacing said lower detent pawl from said floor detent plate to permit said left CAM component to rotate said shift lever to a further selected one of said PRND shifter positions.

14. The shifter of claim 13, further comprising a shift position sensor gear with end support magnet rotatably slaved to said left CAM component, a printed circuit board assembly (PCBA) mounted within said housing in proximity to said sensor gear and including a sensor opposing a shaft end supported magnet of said sensor gear for instructing rotation of said gear seeking motor.

15. The shifter of claim 13, further comprising a gate pawl retraction pin secured to said push rod below said upwardly biased gate pawl, a push rod spring seated within a pocket in said outer tube for upwardly biasing said gate pawl and push rod.

16. The shifter of claim 15, said gear seeking motor further comprising a worm engaging a gear seeking worm gear for driving said right CAM component and slaved left CAM component.

17. The shifter of claim 13, said rotatable base of said shift lever further comprising a plurality of notches or recesses configured within an arcuate surface and corresponding to said PRND shifter position gates.

18. The shifter of claim 17, further comprising a lock motor configured to rotate a shaft supported eccentric cam extending within said housing, said eccentric cam actuating at least one plunger having an extending portion aligning with a selected one of said notches and such that, upon rotation of said eccentric cam by said lock motor, said plunger being caused to displace to a disengaged position to permit gear seeking rotation of said shift lever.

19. The shifter of claim 18, said lock motor further comprising a worm shaft actuating a worm gear, said eccentric cam including an extending end in slaved relationship with said bevel gear so that actuation of said lock motor causes rotation of said cam.

20. A gear seeking shifter, comprising:
- a housing containing a shift lever having a rotatable base and an extending tube supporting an upwardly extending and depressible inner push rod;
- a left CAM component located on a first side of said rotatable base and having a shaft portion projecting through a center axis of said shift lever, a keyed end of said shaft portion engaging a matching recess in a right CAM component located on a second side of said rotatable base for slaving said CAM components together;
- said CAM components being driven by a gear seeking motor;
- a gate pawl secured to said inner push rod and upwardly biased into contact with any of PRND shifter position gates configured along an underside of said housing proximate an elongated track through which said shift lever extends;
- at least one detent pawl incorporated into said rotatable base in biasing contact with an opposing detent plate configured upon an inside surface of said housing, said detent pawl actuated by rotation of said CAM components; and
- upon said CAM components being rotated by said gear seeking motor, said left CAM component including a first profile for retracting said gate pawl from a selected one of said shifter position gates, at least one of said left or right CAM components having a second profile for engaging and inwardly displacing said detent pawl away from contact with said detent plate to rotate said shift lever to a further selected one of said PRND shifter positions.

* * * * *